United States Patent
Jain et al.

(10) Patent No.: US 12,335,375 B2
(45) Date of Patent: *Jun. 17, 2025

(54) SYSTEM AND METHOD FOR SECURE ELECTRONIC DATA TRANSFER

(71) Applicant: KnectIQ Inc., Woodbury, MN (US)

(72) Inventors: Shailendra Jain, Minneapolis, MN (US); Andrew Lunstad, North Oaks, MN (US); Kenneth Morris, Oakdale, MN (US)

(73) Assignee: KnectIQ Inc., Woodbury, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,987

(22) Filed: Jun. 4, 2024

(65) Prior Publication Data
US 2025/0106007 A1    Mar. 27, 2025

Related U.S. Application Data

(63) Continuation of application No. 17/516,889, filed on Nov. 2, 2021, now Pat. No. 12,003,620, which is a continuation of application No. 16/774,344, filed on Jan. 28, 2020, now Pat. No. 11,165,568.

(60) Provisional application No. 62/797,439, filed on Jan. 28, 2019.

(51) Int. Cl.
   *H04L 9/08*    (2006.01)
   *H04L 9/40*    (2022.01)

(52) U.S. Cl.
   CPC .......... *H04L 9/0825* (2013.01); *H04L 9/0822* (2013.01); *H04L 63/0435* (2013.01); *H04L 63/0442* (2013.01)

(58) Field of Classification Search
   CPC . H04L 9/0825; H04L 9/0822; H04L 63/0442; H04L 63/0435
   USPC ...................................................... 713/171
   See application file for complete search history.

(56) References Cited

U.S. PATENT DOCUMENTS

| | | | |
|---|---|---|---|
| 5,455,862 A | 10/1995 | Hoskinson | |
| 6,148,404 A | 11/2000 | Yatsukawa | |
| 7,971,017 B1 | 6/2011 | Mann et al. | |
| 9,344,407 B1 | 5/2016 | McClintock et al. | |
| 9,350,540 B1 | 5/2016 | Pizano | |
| 9,832,016 B2 | 11/2017 | Yang et al. | |
| 10,020,940 B2 | 7/2018 | Freed | |
| 10,116,443 B1 | 10/2018 | Kalach et al. | |
| 10,320,785 B2 | 6/2019 | Morris | |
| 11,316,666 B2 * | 4/2022 | Leavy ................... | H04L 9/0841 |
| 2003/0044017 A1 | 3/2003 | Briscoe | |

(Continued)

FOREIGN PATENT DOCUMENTS

| | | |
|---|---|---|
| CN | 101989984 A | 3/2011 |
| CN | 103067158 A | 4/2013 |

(Continued)

OTHER PUBLICATIONS

PCT Search Report and Written Opinion for PCT/US2020/015448, mailed Nov. 17, 2020, 9 pages.

(Continued)

*Primary Examiner* — Samson B Lemma
(74) *Attorney, Agent, or Firm* — Dicke, Billig & Czaja, PLLC

(57) ABSTRACT

Systems and methods for secure electronic data transfer utilizing an ephemeral key for encryption and decryption of data.

16 Claims, 13 Drawing Sheets

(56) References Cited

U.S. PATENT DOCUMENTS

| | | |
|---|---|---|
| 2003/0061516 A1 | 3/2003 | Yamaguchi et al. |
| 2004/0068650 A1 | 4/2004 | Resnitzky et al. |
| 2004/0086124 A1 | 5/2004 | Sasaki |
| 2004/0148344 A1 | 7/2004 | Navar et al. |
| 2007/0195447 A1 | 8/2007 | Starr et al. |
| 2009/0287922 A1 | 11/2009 | Herwono et al. |
| 2010/0254533 A1 | 10/2010 | McCullough et al. |
| 2012/0084570 A1* | 4/2012 | Kuzin ............... G06F 21/41 726/8 |
| 2014/0181892 A1 | 6/2014 | Von Bokern et al. |
| 2014/0351586 A1* | 11/2014 | Hook ............... G06F 21/6218 713/164 |
| 2015/0229621 A1 | 8/2015 | Kariman et al. |
| 2015/0278545 A1 | 10/2015 | Bigras |
| 2015/0319151 A1* | 11/2015 | Chastain ............ H04L 9/083 713/171 |
| 2016/0020899 A1 | 1/2016 | Kato et al. |
| 2016/0080944 A1 | 3/2016 | Colegate et al. |
| 2016/0125416 A1 | 5/2016 | Spencer et al. |
| 2016/0241390 A1* | 8/2016 | Harris ............... G06F 21/602 |
| 2017/0171174 A1 | 6/2017 | Campagna |
| 2017/0324550 A1 | 11/2017 | Yuan et al. |
| 2018/0034813 A1 | 2/2018 | Pizano |
| 2018/0063131 A1* | 3/2018 | Revell ............... H04L 9/0838 |
| 2019/0020633 A1* | 1/2019 | Leavy ............... H04L 9/14 |
| 2019/0268420 A1* | 8/2019 | Acharya ............ H04L 63/166 |
| 2020/0244447 A1 | 7/2020 | Jain et al. |
| 2021/0328976 A1* | 10/2021 | Leavy ............... H04L 9/14 |

FOREIGN PATENT DOCUMENTS

| | | |
|---|---|---|
| CN | 103561044 A | 2/2014 |
| CN | 104023013 A | 9/2014 |
| CN | 106664202 A | 5/2017 |
| JP | 2000-134191 A | 5/2000 |
| KR | 10-2016-0139493 A | 12/2016 |
| WO | 2010094125 A1 | 8/2010 |
| WO | 2018118252 A1 | 6/2018 |

OTHER PUBLICATIONS

Gui-fen Zhao et al., "Secure Voice over Internet Protocol based on Combined Secret Key Method", 2016 2nd IEEE International Conference on Computer and Communications (ICCC), 2016, pp. 186-190.

* cited by examiner

SYSTEM AND METHOD FOR SECURE ELECTRONIC DATA TRANSFER

CROSS REFERENCE TO RELATED APPLICATIONS

This application is a continuation of U.S. patent application Ser. No. 17/516,889, filed on Nov. 2, 2021, which claims the benefit of U.S. patent application Ser. No. 16/774,344, filed on Jan. 28, 2020, now U.S. Pat. No. 11,165,568, which claims the benefit of the filing date of U.S. Provisional Patent Application Ser. No. 62/797,439, filed Jan. 28, 2019, entitled "SYSTEM AND METHOD FOR SECURE ELECTRONIC DATA TRANSFER," the entire teachings of each of which are incorporated herein by reference.

BACKGROUND

The present disclosure is directed to secure electronic data transfer. More particularly, it relates to systems and methods for encryption and decryption of data using ephemeral keys.

Cybersecurity and more specifically the protection of personal and computing device information has become an individual and national concern. Data and hardware breaches continue to rise. Identity theft, ransomware, medical device intrusion, cyber-carjacking, energy grid cyberattacks, financial services and banking hacks and theft medical and health information raise significant concerns among individuals, private sector employees, and governments.

Providing for the secure transfer of encoded data can include the use of public and private keys, trusted certificate technology, and/or tokenization. Use of these technologies, when used to harden data security, are effective but the tradeoff is the suboptimal use and flexibility of the underlying data. Solutions to this problem of balance are often tipped in favor of greater flexibility in data use resulting in less protection for personal and computing device identifying information.

Cryptography is often employed in the electronic transfer of confidential information whereby the information, message, data package, etc., being sent is encrypted or encoded in such a way that only authorized parties can access. An encryption scheme typically uses a pseudo-random key(s) to encrypt/decrypt the information of interest. Encryption itself does not prevent an unauthorized recipient from intercepting the message or encrypted information. However, only an authorized viewer will have access to the key(s) necessary to decrypt the encrypted information; absent the key(s), an unauthorized user will not be able to easily decrypt the information.

Secure encryption for electronic data transfer can employ a symmetric scheme (private key/private key) or an asymmetric scheme (public key/private key). With these (and other) key-based encryption architectures, while the key(s) in question are randomly generated, at least the private key(s) are often stored for relatively long periods of time. Stored keys, in turn, are subject to attack (cyberattack or otherwise). Once an unauthorized user has gained access to a private key, intercepted encrypted information is no longer secure. To guard against attacks on encryption keys, encryption key management systems have been developed. For example, the electronic repository of private keys (or key management server) maintained by a particular organization can be encrypted, and the key(s) or other information necessary to access the electronic database are stored elsewhere. This added layer of security is also subject to attack, and can be intricate to implement and costly to maintain. In addition or alternatively, an organization may require that all stored keys be periodically de-activated (or revoked) and replaced with a new key. This approach is likewise costly and inefficient.

SUMMARY

The inventors of the present disclosure have recognized a need to address one or more of the above-mentioned problems.

Some aspects of the present disclosure relate to systems for secure electronic data transfer. Some aspects of the present disclosure relate to methods for secure electronic data transfer.

DETAILED DESCRIPTION

Figure 1:
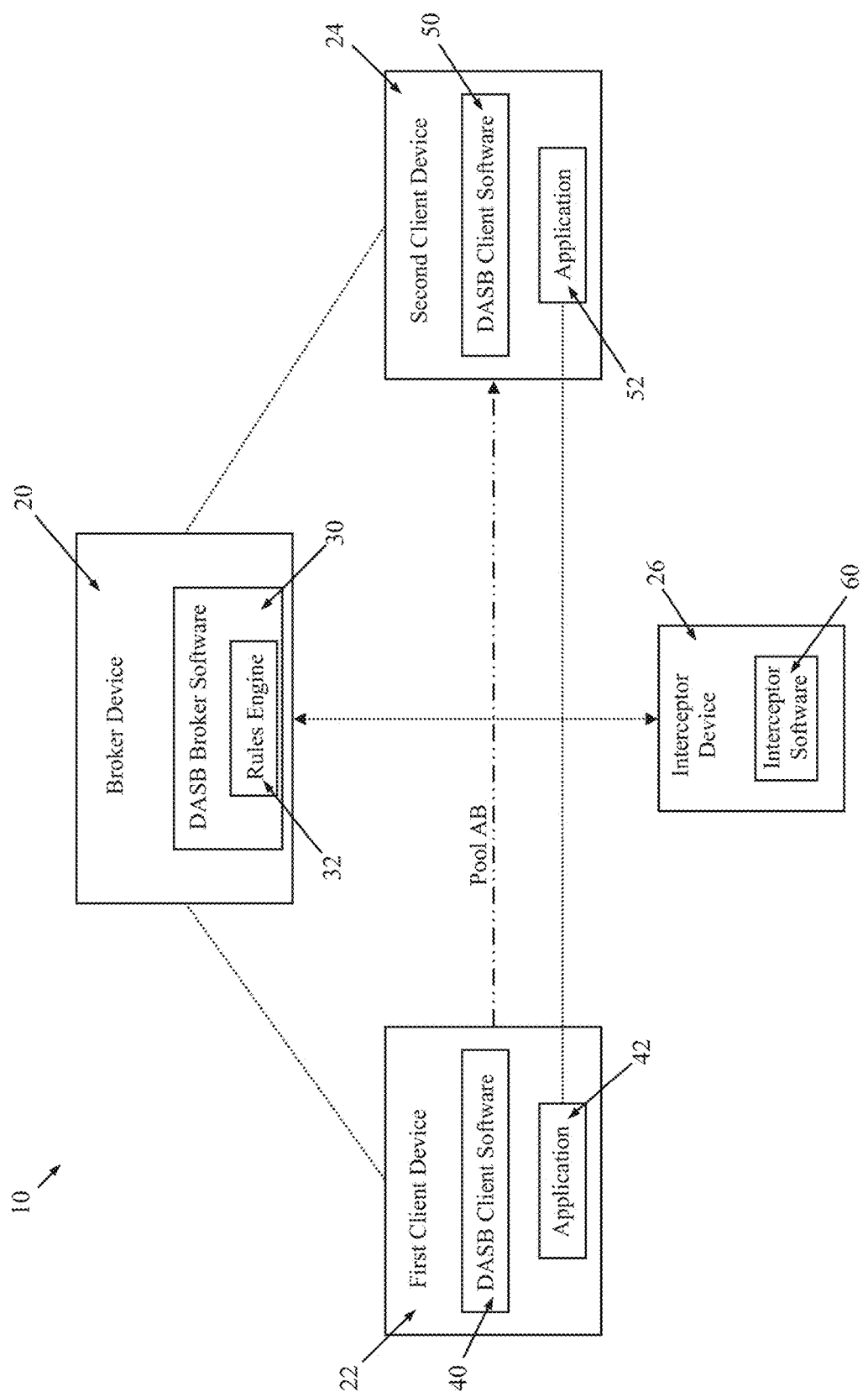
FIG. 1 is a block diagram illustrating a system in accordance with principles of the present disclosure.

Some aspects of the present disclosure are directed to systems and methods for the secure electronic transfer of data. One example of a system 10 in accordance with principles of the present disclosure and with which methods of the present disclosure can be performed in shown in FIG. 1. The system 10 includes a broker device 20 and two or more client devices, such as a first client device 22 and a second client device 24, and an optional interceptor device 26. The broker device 20 can be, or can be akin to, a computer or computing device having at least a processor and a memory, and in some non-limiting embodiments is a computer server as is known in the art (e.g., one or more dedicated commercially available hardware servers (e.g., having multi-core processor(s), RAM, network interface adaptor(s), and hard drives) running typical server-class operating systems (e.g., Linux)). In other embodiments, the broker device 20 can be implemented across a scalable infrastructure comprising multiple such servers, solid state drive and/or other applicable high-performance hardware. The client devices 22, 24 and the interceptor device 26 (where provided) can be, or can be akin to, a computer or computing device having at least a processor and a memory, such as desktop computer, laptop computer, smartphone, chip set, system on a chip, ASIC, etc., as is known in the art. The devices 20, 22, 24, 26 are configured to electronically communicate with one another in various fashions, such as on a wireless communication system, a wired communication system, etc., as is known in the art.

As a point of reference, the systems and methods of the present disclosure facilitate secure data transfer within, for example, a trust environment, using an encryption architecture in which data is encrypted and decrypted using a key. The coordination of key creation and distribution for secure communication of the present disclosure can in some embodiments be referred to as "device access security broker" or "DASB". As described in greater detail below, appropriate programming (i.e., computer program, software, hardware, firmware, etc.) is installed on or provided with each of the broker device 20, the client devices 22, 24, and the interceptor 26 (where provided), and operates in a coordinated fashion to perform the methods of the present disclosure.

For example, software or module 30 ("DASB Broker Software") is installed on or operated by the broker device 20. The DASB Broker Software 30 includes programming that implements the generation of pre-key data (or "Key DNA") as described below. Key DNA is in reference to complete or partial data that allow (or can function as a "seed") for the subsequent creation of an encryption key (e.g., a symmetric key). The DASB Broker Software 30 can further include programming that implements the generation of a complete or partial moniker as described below. Moniker is in reference to a short-hand identifier (e.g., a character string) for the corresponding Key DNA. In some non-limiting embodiments, the DASB Broker Software 30 operates a rules engine or module 32 that permits or declines a requested transfer of data between two devices in the system 10, for example between the first and second client devices 22, 24, as described below. As used throughout the present disclosure, a broker device loaded with (or operating) DASB Broker Software is referred to as a "Broker". Thus, for example, the broker device 20 of FIG. 1 can also be referred to as a Broker of the system 10.

Software or module 40 ("DASB Client Software") is installed on the first client device 22. The DASB Client Software 40 is programmed to interface with the DASB Broker Software 30, to generate an encryption key (e.g., a symmetric key) based upon received Key DNA, and interface with one or more applications run by the first client device 22. For example, one such application 42 is generically identified for the first client device 22 in FIG. 1; while the application 42 is generally reflected as being stored on the first client device 22, in other embodiments, the application(s) of interest is not stored on the first client device 22 but instead, for example, can run on another computing device in the same local network (LAN) that communicates with the first client device 22. The application(s) 42 can be any program, or group or programs, designed or written for an end user such as database programs, digital document programs (e.g., PDF), word processors, spreadsheets, messaging programs (e.g., email), CAD, etc. Interaction between the DASB Client Software 40 and the application(s) 42 is described in greater detail below. In more general terms, the application(s) 42 can be written or coded to interface with the DASB Client Software 40 as installed to the first client device 22, a software patch or plug-in can be coded or installed to the application(s) 42 that facilitates interface between the application(s) 42 and the DASB Client Software 40, or other known computer programming techniques can be employed.

DASB Client Software 50 is also installed on the second client device 24. The DASB Client Software 50 on the second client device 24 can, in some embodiments, be identical to the DASB Client Software 40 installed on the first client device 22. With this in mind, the DASB Client Software 50 interfaces with one or more applications stored on, and run by, the second client device 24 one of which is generically identified at 52 in FIG. 1. The application(s) 52 associated with the second client device 24 can have any of the forms described above with respect to the application(s) 42 of the first client device 22. As indicated by a dashed line in FIG. 1, the application 42 associated with the first client device 22 and the application 52 associated with the second client device 24 can electronically communicate with one another using known technologies and techniques as part of, for example, a computerized network.

With optional embodiments in which the interceptor 26 is provided, control software 60 ("Interceptor Software") can be installed on the interceptor 26. The control software 60 is programmed to interface with the DASB Broker Software 30 as described in greater detail below, including receiving approval requests from the DASB Broker Software 30 and communicating decisions to such requests to the DASB Broker Software 30. In this regard, the control software 60 in tandem with a format of the interceptor 26 can optionally provide (e.g., visually display) approval request information to a human user and/or facilitate delivery of a human user's decision to a particular approval request. In other embodiments, the system 10 can be formatted such that some electronic transmission requests are required to pass through the interceptor 26, while other transmission requests are not (e.g., a request to transfer data from an application of the first client device 22 to an application of the second client device 24 must pass through the interceptor 26 for approval, whereas a request to transfer data from an application of the second client device 24 to an application of the first client device 22 need not pass through the interceptor 26 for approval). In other embodiments, the interceptor 26 (and thus the control software 60) can be omitted.

The flow charts and block diagrams of FIGS. 2A-2C and 3-11 illustrate some methods and arrangements of the present disclosure, along with the functionality and operation of various components of the present disclosure. In this regard, some of the blocks of the flow charts may represent a module segment or portion of code of a program of the present disclosure that includes one or more executable instructions for implementing or effecting the specified logical function or functions. In other embodiments, the functions noted in the various blocks may occur in an order differing from the order depicted.

With reference between FIGS. 1 and 2A-2C, some methods of the present disclosure provide for secure electronic data transfer from an application of a sender client device to an application of a receiver client device within the system 10.

The DASB Client Software 40 of the first client device 22 is provisioned with the DASB Broker Software 30 at step 100 (e.g., where the DASB Client Software 40 is loaded or stored on the first client device 22, it can be considered that the first client device 22 is provisioned with or by the DASB Broker Software 30 at step 100; where the first client device 22 is operating the DASB Client Software 40 through a separate portal, the provisioning of step 100 can be considered as provisioning the DASB Client Software 40 alone). The DASB Second Client Software 50 of the second client device 24 is similarly provisioned with the DASB Broker Software 30 at step 102. The provisioning can assume various formats and can entail the generation of various information on one or more of the DASB Broker Software 30, the DASB Client Software 40 of the first client device 22, and the DASB Client Software 50 of the second client device 24 as described below. In some embodiments, the provisioning at step 100 includes establishing a unique client ID (or "First Client ID") for the DASB Client Software 40 of the first client device 22, and storing the First Client ID on the broker device 20 with the DASB Broker Software 30 and on the DASB Client Software 40 of the first client device 22. The First Client ID is unique to the DASB First Client Software 40 as operated by the first client device 22. Similarly, the provisioning at step 102 includes establishing a unique client ID (or "Second Client ID") for the DASB Client Software 50 of the second client device 24, and storing the Second Client ID on the broker device 20 with the DASB Broker Software 30 and on the DASB Client software 50 of the second client device 24. The Second Client ID is unique to the DASB Second Client Software 50 as operated by the second client device 24.

As used throughout the present disclosure, any type of "client device" loaded with or operating an assigned DASB Client Software (or any other set of functions as described below that can be implemented on a client device) and that has been provisioned by the DASB Broker Software 50 (or more simply the Broker) is referred to as a "DASB Client". In trust environments of the present disclosure, the DASB Clients communicate with the Broker and with each other. To further confirm this terminology, the first client device 22 is considered or can be referred to as a DASB Client following step 100, as can the second client device 24 following step 102. Thus, for example, in the trust environment of FIG. 1, the first and second client devices 22, 24 can also referred to as first and second DASB Clients 22, 24.

Figure 2A:
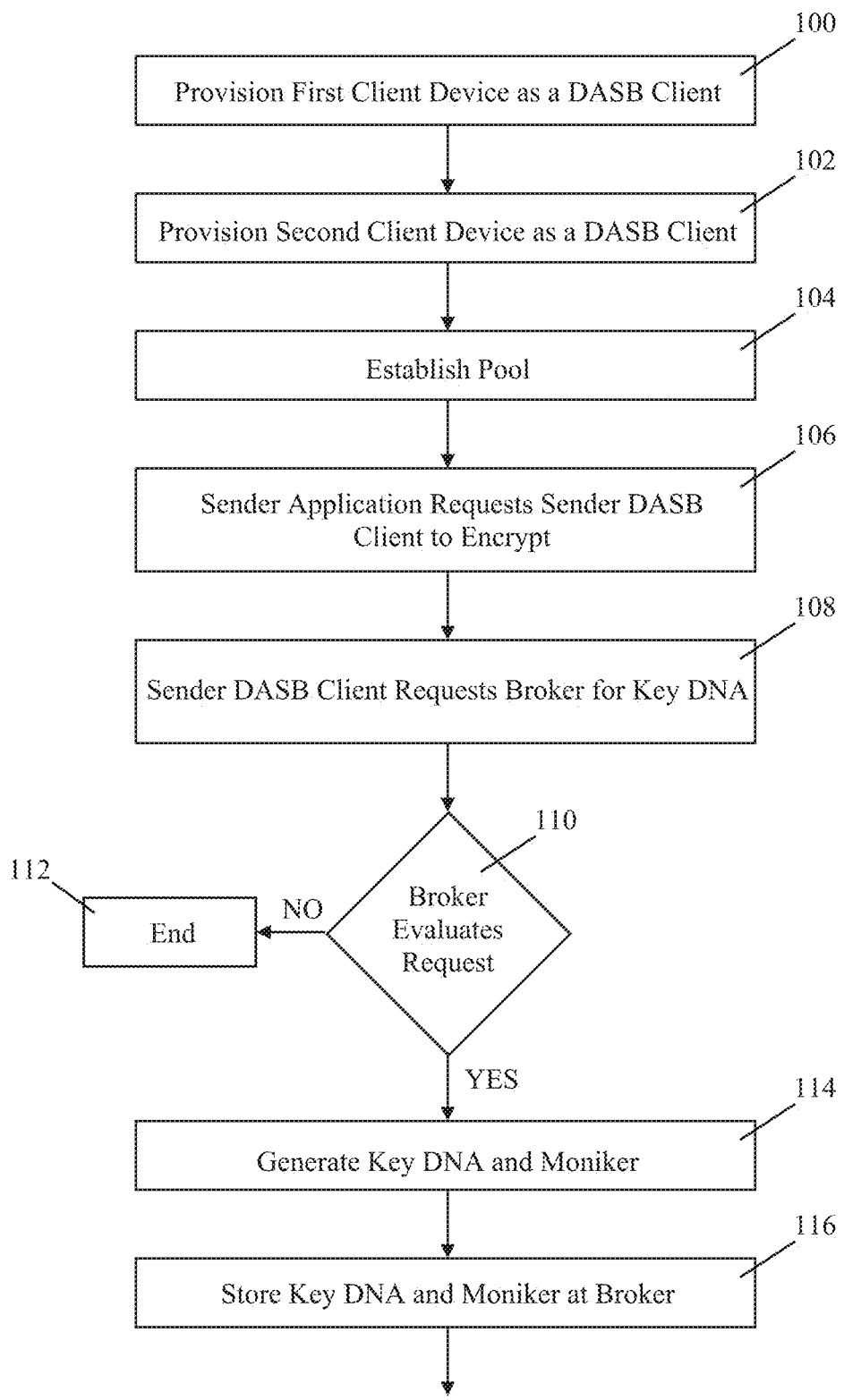
FIGS. 2A-2C is a flow diagram of steps performed in accordance with some methods of the present disclosure, including a method for secure electronic data transfer.
Figure 2B:
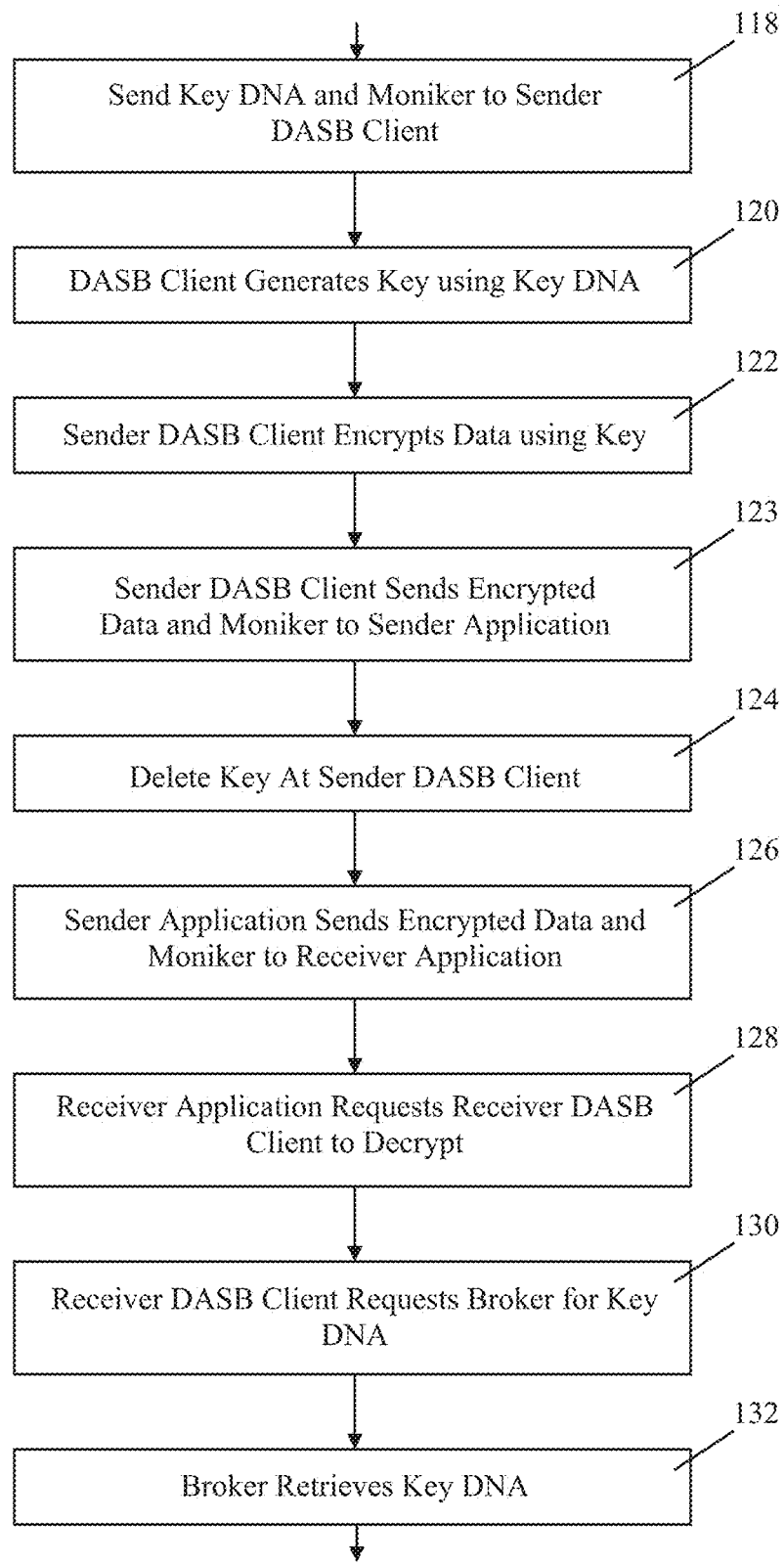
Figure 2C:
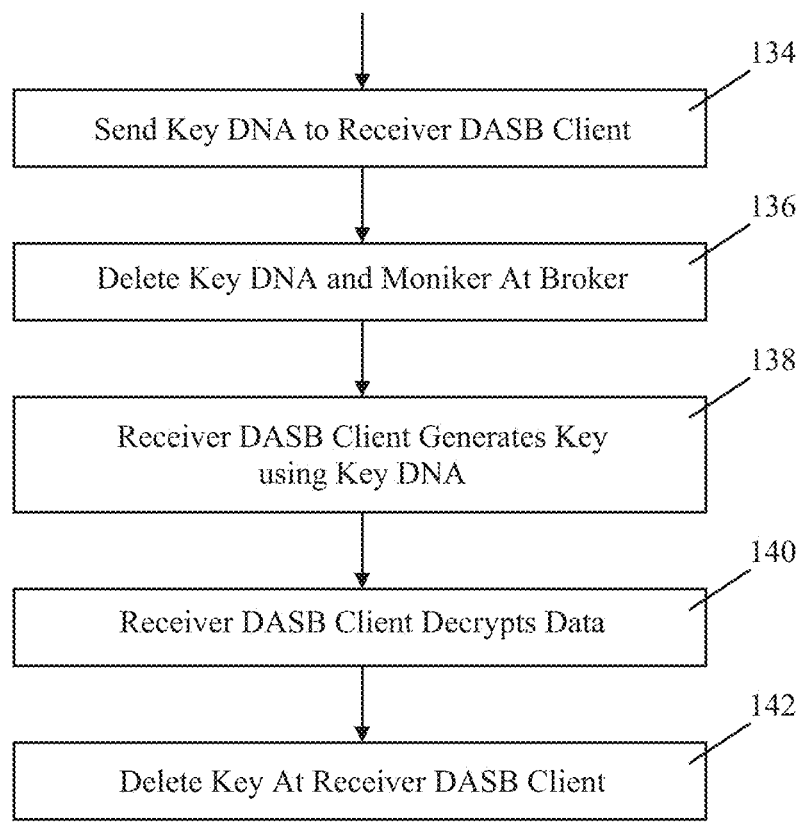

A remainder of the methods implicated by FIGS. 2A-2C can more easily be understood with reference to an intended data transfer from a sender to a receiver. For ease of explanation, one non-limiting example is in the context of an intended data transfer from the application 42 of the first DASB client 22 to the application 52 of the second DASB client 24. Commensurate with this but one, non-limiting example, in the explanations below, the first DASB client 22 serves as, and is interchangeably referred to as, the "Sender DASB client", with the DASB Client Software 40 and the application 42 associated with the first DASB client 22 interchangeably referred to as the "Sender DASB Client Software" and the "Sender Application", respectively; the second DASB device 24 serves as, and is interchangeably referred to as, the "Receiver DASB client", with the DASB Client Software 50 and the application 52 interchangeably referred to as the "Receiver DASB Client Software" and the "Receiver Application", respectively.

In some optional embodiments, at step 104, a pool is created on the DASB Broker Software 30 that generally permits the Sender DASB client 22 to send information to the Receiver DASB client 24 under an assigned Pool Identifier. A Pool Identifier serves as a virtual relationship between two provisioned client devices of the system 10 with a human readable identifier. While with this one example, the established pool entails only two client devices (i.e., the Sender and Receiver DASB clients 22, 24), in other circumstances a particular pool can entail three or more DASB clients (e.g., a pool that permits the first DASB client 22 to send information to a group of DASB clients (e.g., a group of DASB clients associated with a particular sub-set of an organization such as an engineering group, sales group, etc.)). The pool can be created or generated in various manners, and in some embodiments can include an authorized administrator of the Broker 20 manually entering or registering the pool and corresponding Pool Identifier via the DASB Broker Software 30. Rules can optionally be included with a particular pool, such as, for example, whether or not approval of a request to encrypt and/or decrypt (or other transaction) must be gated through the interceptor 26, length of time a particular receiver device application has to decrypt received data, etc. In some optional embodiments, the pool and Pool Identifier (and any rules associated with the particular pool) are saved in the rules engine 32.

The Pool Identifier assigned to the so-created pool is stored at or by one or more applications of interest of the Sender DASB client 22 (e.g., the Sender Application 42 associated with the Sender DASB client 22), for example by a creator of the application(s) in question, a creator of the particular pool (e.g., the authorized administrator), etc.). Different applications associated with (or used by) a particular client device may or may not use the same set of pools. Pools may be totally separate, the same, or have some overlap. In yet other embodiments, the application(s) associated with (or used by) a particular client device can access a "directory service" that provides a list of Pool Identifiers.

FIG. 1 schematically illustrates the pool for the exemplary example by the staggered dashed-line arrow "Pool AB" (it being understood that the staggered dashed-line arrow Pool AB is not intended to reflect a definitive data path). As a point of reference, the pool created at step 104 may alternatively designate that the first DASB client 22 and the second DASB client 24 are generally permitted to send information to one another (as opposed to only the first DASB client 22 being permitted to send information to the second DASB client 24); under these circumstances, the assigned Pool Identifier would also be stored at or by one or more applications of interest associated with the second DASB client 24 (e.g., the application 52). The pooling rules, if any, associated with the assigned Pool Identifier as stored at the Broker 20 may be changed or altered over time (e.g., by an authorized administrator). In yet other embodiments, the methods of the present disclosure do not entail implementation or access to an established pool as part of the encryption, transfer and decryption of data, such that step 104 (and other steps described below referencing a pool) can be omitted.

At step 106, the Sender Application 42 is operated to request the Sender DASB Client Software 40 to encrypt data of the Sender Application 42 ("Data X") for sending to the Receiver Application 52 (otherwise operating on the receiver client device 24). As explained above, the Sender Application 42 is written, or a software plug-in or patch is installed, whereby the Sender Application 42 automatically interfaces with the Sender DASB Client Software 40 for an encryption operation (e.g., in response to a user-prompted request for encryption or similar secured transmission request).

At step 108, and in response to the request at step 106, the Sender DASB client 22 communicates a request ("Request X") to the Broker 20 for Key DNA. As part of the request at step 108, the Sender DASB client 22 will provide the Broker 20 with the First Client ID and a Request Pool Identifier. The Request Pool Identifier is of a format corresponding with the Pool Identifiers described above and signifies an intended recipient(s) of the data to be transferred. Thus, with this one example, Request X will include a Request Pool Identifier that signifies an intention to transfer information from an application of the Sender DASB client 22 to an application of the Receiver DASB client 24. As a point of reference, subsequent requests from the Sender DASB Client 22 to the Broker 20 for Key DNA will include the same First Client ID; however, the Request Pool Identifier provided with these subsequent requests may differ as a function of the intended recipient(s).

In some optional embodiments, at step 110, the Broker 20 reviews stored pools to permit or decline Request X. For example, the DASB Broker Software 30 can operate to compare the Request Pool Identifier (provided with Request X) with stored Pool Identifiers. If no match is found, Request X is denied (i.e., there is no relationship in the Broker 20 permitting the Sender DASB client 22 to transfer data to the Receiver DASB client 24). In addition, the Broker 20 can operate to review the rule(s), if any, associated with the matched Pool Identifier to, for example, determine whether or not Request X satisfies the rule(s), whether other actions are required, etc. (e.g., where Request X is received at 10:00 PM and the rules associated with the matched Pool Identifier permit encryptions from 8:00 AM-5:00 PM, the rule is not satisfied and Request X is rejected). In yet other optional embodiments, systems and methods of the present disclosure can omit step 110 (e.g., under circumstances where no pool is created or utilized for a particular client device-to-client device transfer of information).

If, at step 110, the Broker 20 declines Request X ("NO"), the Broker 20 does not provide the Sender DASB client 22 with Key DNA, and Data X cannot be encrypted (step 112). If, at step 110, the Broker 20 accepts Request X ("YES"), the DASB Broker Software 30 generates Key DNA ("Key DNA X") and a matching moniker ("Moniker X") at step 114. In some optional embodiments described in greater detail below, one or more additional steps may occur between steps 110 and 114 (e.g., the interceptor 26 may be prompted to approve or deny Request X). At step 116, Key DNA X and Moniker X are stored as a key value pair in the Broker 20. Key DNA X and Moniker X are delivered to the Sender DASB client 22 at step 118.

At step 120, the Sender DASB Client Software 40 generates a symmetric Key ("Key X") based, at least in part, upon the supplied Key DNA X. The Sender DASB Client Software 40 includes or utilizes installed key software programming, for example a known cryptographic algorithm such as an Advanced Encryption Standard (AES). While the generated Key X is based upon the Key DNA X (and optionally bits generated elsewhere), Key X will not be identical to the Key DNA X.

At step 122, the Sender DASB Client Software 40 encrypts Data X using Key X, for example via known encryption techniques, resulting in Encrypted Data X. Encrypted Data X and Moniker X are communicated by the Sender DASB Client Software 40 to the Sender Application 42 at step 123. Once Encrypted Data X is complete, the Sender DASB Client Software 40 operates to remove or permanently delete Key X at step 124. In other words, following step 124, Key X is not stored and does not exist on the Sender DASB client 22.

The Sender DASB client 22 electronically sends Encrypted Data X and Moniker X to the Receiver DASB client 24 at step 126; for example, the Sender Application 42 operates to electronically send Encrypted Data X and Moniker X to the Receiver Application 52. As a point of reference, the Sender Application 42, after using the corresponding Sender DASB Client Software 40 to complete the encryption process, may choose to deliver Encrypted Data X however it wishes. It could be via SMTP (email), FTP, via DropBox or other content sharing service, stored on a portable media, etc. In more general terms, a client application, upon calling a corresponding DASB Client Software with data to be encrypted, will be returned the assigned moniker and the encrypted data payload (e.g., step 123 described above). Applications written to use the infrastructure of the present disclosure will "know" that it has to supply the assigned moniker and encrypted payload when electronically sending the encrypted data to another client device/application. In some embodiments, distinguishing the moniker from the encrypted data payload is part of the API that the client device exposes. Other variations are also acceptable, such as where the moniker can be derived by computing a hash of the payload, prefixing the payload with a moniker, etc.

At step 128, the Receiver Application 52 identifies the Encrypted Data X as encrypted, and is operated (or automatically operates) to request the Receiver DASB Client Software 50 to decrypt. For purposes of this example, it is assumed that the Sender Application 42 and the Receiver Application 52 are of the same type (e.g., both are word processors). As a point of reference, automatic invoking of the Receiver Application 52 can be an operating system (OS) level feature. It can be a convenience feature that will work differently in different environments and can depend upon how the particular application packaged the content. In most OS's, the automatic launching of an application is triggered by the file extension of received data. In one non-limiting implementation, the received moniker (Moniker X), encrypted payload (Encrypted Data X) and possibly other metadata could be bundled into a file for delivery to the receiving client application with the extension ".docsecret" (or similar extension). An application registered at the OS to look for this extension would be programmed to know how to parse the file for the moniker and the encrypted payload, and to feed those bits to the DASB Client Software 50 as part of the decryption request at step 128. In more general terms, the Receiver Application can interface with the corresponding DASB Client Software in a variety of different manners. The DASB Client Software can be automatically or intentionally invoked to perform a decryption operation, and can be informed of the existence of encrypted data in any of a number of different manners as will be apparent to one of ordinary skill.

At step 130, and in response to the request at step 128, the Receiver DASB client 24 communicates a request to the Broker 20 for Key DNA. As part of the request at step 130, the Receiver DASB client 24 will provide the Broker 20 with Moniker X (such that the request is effectively specific to Key DNA X) and the assigned Client ID (i.e., with the described example, the Second Client ID).

In some optional embodiments described below, before the Broker 20 operates to provide the Receiver DASB client 24 with Key DNA X, an approval operation is performed.

For example, with embodiments in which the interceptor 26 is provided, it may be required that the request to transfer Key DNA X to the Receiver DASB client 24 must first pass through the interceptor 26 for approval. This requirement can be a universal rule of the system 10, or can be a rule specific to transfers from the first DASB client 22 to the second DASB client 24. The Broker 20 can determine or look up relevant information (e.g., use of the interceptor 26, Pool Identifier or pooling rules, client device membership in the system 10, etc.) based upon the moniker (i.e., Moniker X in the example) supplied with the request for Key DNA to decrypt.

At step 132, the Broker 20 retrieves the Key DNA corresponding with the supplied moniker (i.e., the DASB Broker Software 30 reviews stored key value pairs for Moniker X to locate Key DNA X). The Broker 20 delivers, or prompts the delivery of, the retrieved Key DNA X to the Receiver DASB client 24 at step 134. At step 136, the DASB Broker Software 30 operates to delete Key DNA X and Moniker X from the Broker 20 (e.g., immediately, upon occurrence of another event(s) as described below, etc.).

At step 138, the Receiver DASB Client Software 50 generates a symmetric Key based, at least in part, upon the supplied Key DNA X. Because the Receiver DASB client 24 includes or utilizes the same installed key software programming as the Sender DASB client 22, the symmetric Key generated by the Receiver DASB Client Software 50 using Key DNA X will be identical to the symmetric Key generated by the Sender DASB Client Software 40 at step 120 (i.e., the Receiver DASB Client Software 50 will generate the same Key X). The Receiver DASB Client Software 50, at step 140, then decrypts Encrypted Data X, resulting in Data X (i.e., following step 140, Data X is now useful with the Receiver Application 52). Finally, at step 142, the Receiver DASB Client Software 50 operates to remove or permanently delete Key X. In other words, following step 142, Key X is not stored and does not exist on the second DASB client 24.

With the above-described methods, the symmetric Keys utilized to encrypt and decrypt electronically transferred data are ephemeral, and never exist or are stored on the Broker 20. Unlike conventional key-based encryption systems and methods, a symmetric key cannot be illicitly retrieved from the Broker 20, and intricate key management protocols are not necessary. Further, once the ephemeral symmetric key is used to encrypt data at a sender client device, it is immediately deleted from that device; similarly, once the ephemeral symmetric key is used to decrypt data at a recipient client device, it is immediately deleted from that device.

In some optional embodiments, the systems and methods of the present disclosure promote secure, streaming-type communications between DASB clients (and in particular streaming-type applications operated by the DASB clients) of the system 10. In general terms, following a user-initiated action to start streaming data on a Moniker, a key change is forced to occur; between key changes, For example, and with reference between FIGS. 1 and 3, a streaming application can be initiated by an application 150 of the Sender DASB client 22 to be communicated to an application 152 of the Receiver DASB client 24. The sender application 150 opens an "EncryptStream" operation by which the Sender DASB client device 22 communicates a request to the Broker 20 for Key DNA ("genkey" in FIG. 3). Commensurate with the descriptions above, the Key DNA (and optionally a Moniker) is generated by the Broker 20 ("Key DNA1" for the first such request) and returned to the Sender DASB client 22; the Sender DASB Client Software 40 generates a Key based, at least in part, upon the supplied Key DNA (e.g., in the first instance, the Sender DASB client 22 generates Key1 based on Key DNA1); the supplied Key DNA and/or the generated Key are saved in memory by the Sender DASB client 22 as "Current Key DNA" and/or "Current Key" (e.g., in the first instance, Key DNA1 is saved as the Current Key DNA and/or the generated Key1 is saved as the Current Key); the Sender DASB Client Software 40 encrypts a data block or packet of the stream at the sending application 150 using the Key; and the Sender DASB client 22 sends the encrypted data block or packet of the stream to the Receiver DASB client 24. The receiver application 152, upon receiving the initial data block or packet of the stream, opens a "DecryptStream" operation by which the Receiver DASB client communicates a request to the Broker 20 for Key DNA1 ("fetchKeyForIndex" in FIG. 3). Commensurate with the descriptions above, the Broker 20 retrieves and delivers Key DNA1 to the Receiver DASB client 24; the Receiver DASB client 24 generates Key1 based upon Key DNA1; the Receiver DASB client 24 decrypts the encrypted data block or packet for action by the receiver application 152 and saves one or both of the Key DNA1 or Key1 as a Current Key DNA or Current Key.

The sender application 150 can send encrypted data to the receiver application 152 as it is being encrypted or all together as a single data block or packet. Regardless, the above process continues during the streaming communication, with the data blocks or packets being successively encrypted. With each successive data block or packet, the sender application 150 sends a request to the Sender DASB Client Software 40 for encryption ("Many encryptStream Calls" in FIG. 3). In each instance, the Sender DASB Client Software 40 references a streaming communication key rotation rule to determine whether the Current Key or the Current Key DNA can be utilized to encrypt, or whether a new Key should be generated. For example, the streaming communication key rotation rule can dictate that after certain number of data blocks have been encrypted using the Current Key and/or after a certain length of time, Key rotation or change is required. So long as the streaming communication key rotation rule does not require a change in the Current Key, the Current Key (or the Current Key DNA) as saved at the Sender DASB client 22 is utilized to encrypt the data block or packet for which encryption is requested. Similarly, with each successively received data block or packet, the receiver application 152 sends a request to the Receiver DASB Client Software 50 for decryption ("Many decryptStream calls" in FIG. 3). In each instance, the Receiver DASB Client Software 50 references the same streaming communication key rotation rule as utilized with the Sender DASB Client Software 40 to determine whether the Current Key or the Current Key DNA can be utilized to decrypt, or whether a new Key should be generated. So long as the streaming communication key rotation rule does not require a change in the Current Key, the Current Key (or the Current Key DNA) as saved at the Receiver DASB client 24 is utilized to decrypt the data block or packet for which decryption is requested.

Figure 3:
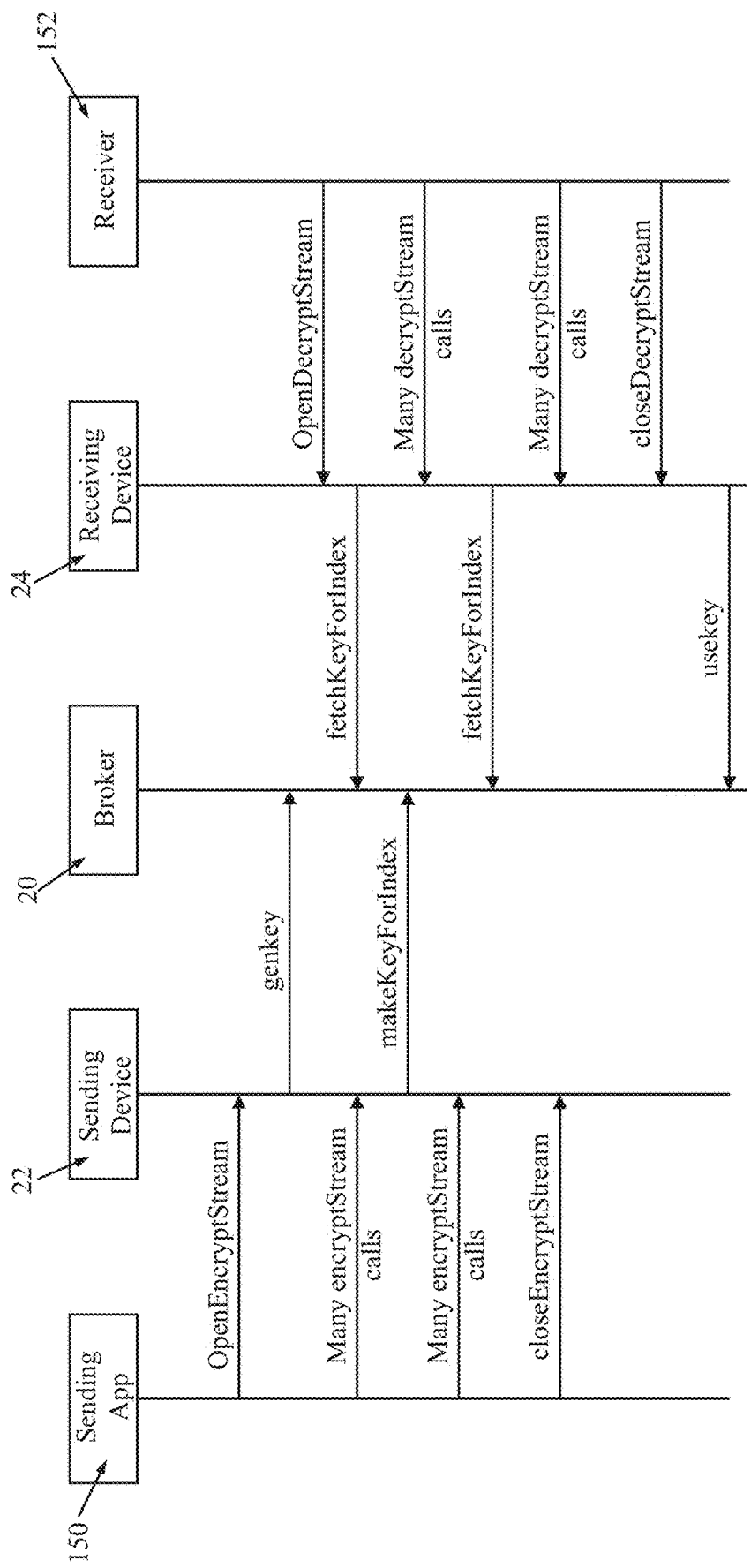
FIG. 3 is a timing diagram of steps performed in accordance with some methods of the present disclosure, including an optional secure streaming mode of operation.
Figure 4:
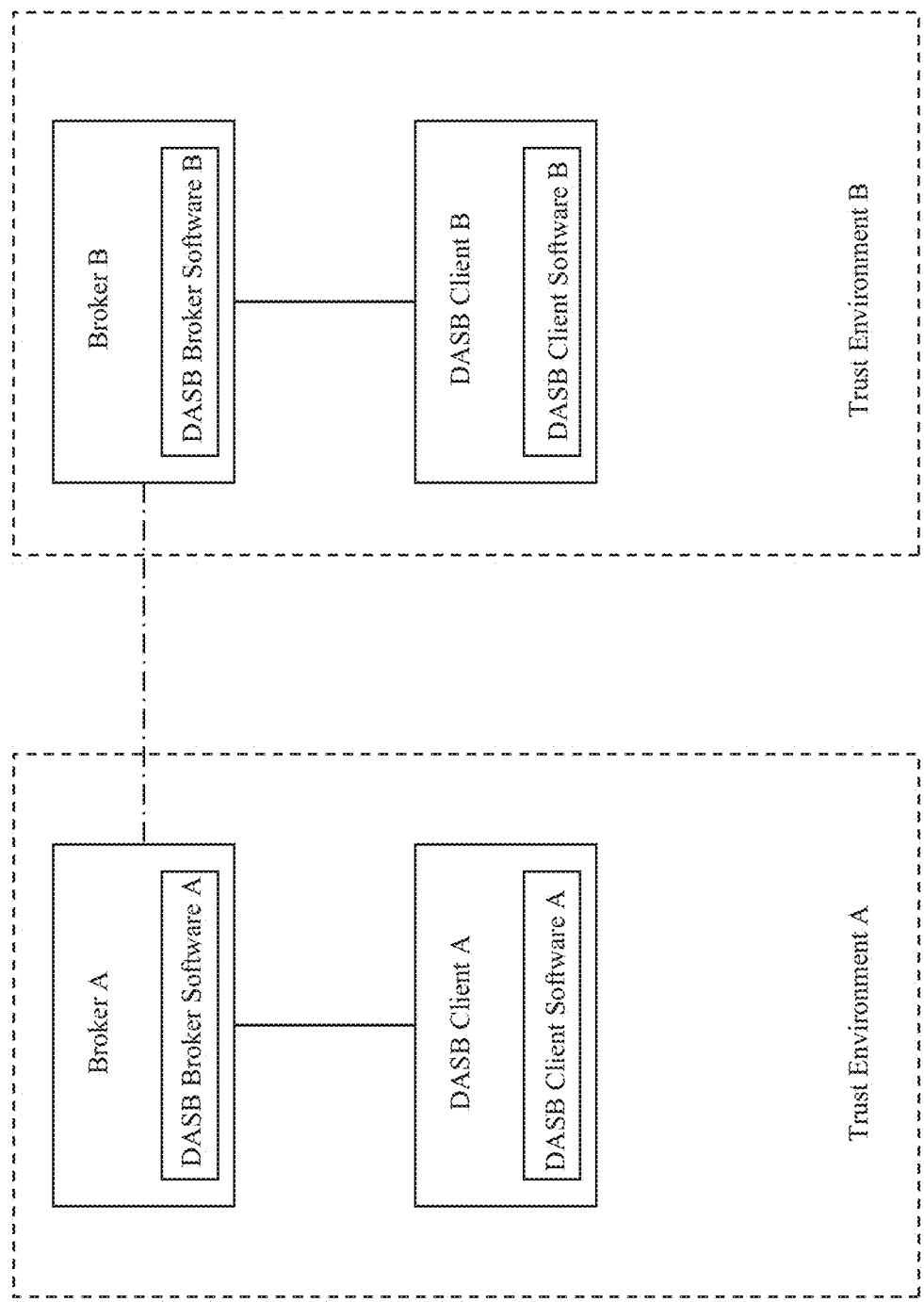
FIG. 4 is a block diagram illustrating another system in accordance with principles of the present disclosure, including more than one trust environment.

As the time for rotating the Current Key (or Current Key DNA) draws near, the Sender DASB client 22 is prompted or operated to obtain a new Key DNA from the Broker 20 ("makeKeyForIndex" in FIG. 3), and the Receiver DASB client 24 is prompted or operated to obtain this same new Key DNA from the Broker 20 ("fetchKeyForIndex" in FIG. 3). Continuing the above example, then, at the start of the streaming-type communication between the Sender DASB client 22 and the Receiver DASB client 24, Key DNA1 is the basis for the Key utilized to encrypt/decrypt. At some point in time, the Sender DASB client 22 will request and receive new Key DNA (Key DNA2) from the Broker 20, and use the new Key DNA as the basis for a new Key (Key2). When a corresponding request is received from the Receiver DASB client 24, the Broker 20 will deliver this same, new Key DNA2 to the Receiver DASB client 24. Per the streaming communication key rotation rule, Key2 is then used to encrypt/decrypt the next successive data blocks or packets, and Key2 (and/or Key DNA2) is saved at the Sender DASB client 22 and the Receiver DASB client 24 as the Current Key (or Current Key DNA) for subsequent encryption/decryption operations until the streaming communication key rotation rule requires a new Key, and the process repeats itself. In other embodiments, the request for new Key DNA can be made at the exact point in time in which the streaming communication key rotation rule requires Key rotation, but this may present a performance issue.

The optional streaming-type communication methods described above can be implemented by a sender DASB client streaming to two or more receiver DASB clients (e.g., a group video). Under these circumstances, the sender DASB client can be operated to effectively drop one or (more) of the receiver DASB clients from the streaming communication by denying access of the selected receiver client device(s) to new Key DNA. Following a Key rotation, the selected receiver client device(s) will no longer be able to decrypt the incoming, encrypted data blocks or packets.

As indicated above, the systems and methods of the present disclosure are not limited to a sender DASB client sending encrypted data to a single receiver DASB client. Where a particular pool for a Sender DASB client designates multiple Receiver DASB clients, the Sender DASB client will receive (or otherwise generate) Key DNA and a moniker for a requested encryption operation from the Broker 20, encrypt the data in question, and provide to the Sender Application as described above. The Sender Application then operates to send the encrypted data and moniker information to each of the multiple DASB clients of interest. Each individual receiver DASB client then operates as described above (e.g., Receiver Application requests the corresponding Receiver DASB Client Software to decrypt the encrypted data, and the Receiver DASB client in turn requests the corresponding Key DNA from the Broker 20). With these and related embodiments, the Broker 20 can be programmed with rules governing deletion of the Key DNA from the Broker 20 based upon the received requests for decryption (e.g., the Broker 20 does not delete the Key DNA and corresponding moniker until all client devices of the designated pool have requested decryption; the Broker 20 deletes the Key DNA and corresponding moniker after a set period of time; etc.).

With the methods of the present disclosure, a DASB client device can operate in two (or more) trust environments, provisioned to interface with the Broker of the particular trust environment. For example, the first DASB client 22 can be provisioned to interface with the Broker 20 of the system 10 as described above, as well as to interface with an entirely different Broker of a separate trust environment/system of the present disclosure.

By default, one DASB client of the system 10 establishes a trust relationship with another DASB client under the control of a given trust environment (and in particular, the DASB Client Software of each DASB client is verified and controlled by the same Broker). For example, and with reference to FIGS. 1 and 4, a first DASB client ("DASB Client A") is controlled by a first trust environment ("Trust Environment A") having a first Broker ("Broker A"); a second DASB client ("DASB Client B") is controlled by a second trust environment ("Trust Environment B") having a second Broker ("Broker B"). Using secure coordination, in some non-limiting embodiments of the present disclosure, Trust Environments A and B can be configured to allow payloads (e.g., encrypted data) generated at DASB Client A to be successfully handled by DASB Client B with all the appropriate logging, etc., being visible in the respective Trust Environments A, B. For example, the Key DNA generated by Broker A and provided to DASB Client A for generating an encryption key can be provided to Broker B for delivery to DASB Client B.

In another example, a DASB client can migrate its trust relationship from one Trust Environment where the initial "owning" environment hands off control, verification, etc., to the new environment. For example, DASB Client A can transfer from Trust Environment A to Trust Environment B by Broker A and Broker B communicating with each other and coordinating with DASB Client A so that the control is handed off from Broker A to Broker B in a coordinated fashion. Once the hand off is complete, DASB Client A is free to establish a trust relationship with another DASB client in Trust Environment B (e.g., a trust relationship with DASB Client B). As a point of reference, the "new" trust environment can, in some examples, create a placeholder for an intended, soon-to-be-transferred-in DASB client, allowing the transferring DASB client to slot in immediately without requiring any further configuration.

In another example, the trust environment spans multiple geographies (i.e., various Brokers are running in geographically different data centers but still collectively define or are part of a single, overall trust environment). An organization or owner of the system/trust environment may denote (e.g., programming or other functions established at one or more of the DASB clients and Brokers in question) some of the DASB clients as being "pinned" or constrained to the Broker of a specific geography; however, other DASB clients (e.g., smartphone) may be allowed to roam. Which Broker is selected will likely be determined by geo IP rules but may also be governed by rules such as time periods or explicit directions. As a roaming DASB client nears a geographically different Broker, it's control information is automatically transferred from the previous Broker. In other words, while all DASB clients are part of one trust environment, the Broker-implemented management of the DASB clients is delegated to geographically close locations to facilitate better performance.

Figure 5:
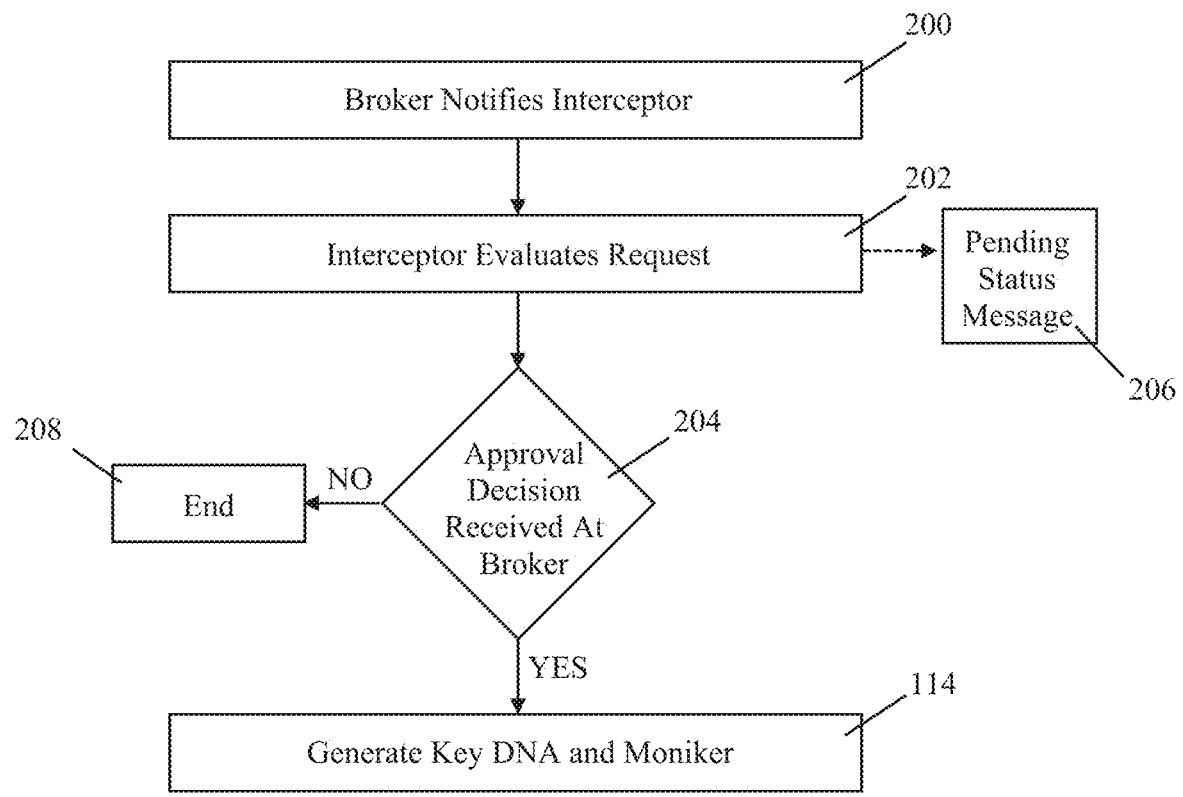
FIG. 5 is a flow diagram of steps performed in accordance with some methods of the present disclosure, including optional operation of an interceptor device to review a request to encrypt data.

As indicated above, in some optional embodiments, the systems and methods of the present disclosure can entail use or operation of the interceptor 26. For example, in some embodiments, after a request for Key DNA is received at the Broker 20 (i.e., step 110) and before the Key DNA is generated and delivered in response to the request (i.e., step 114), methods of the present disclosure can include interfacing with the interceptor 26 as shown in FIG. 5. For example, and with reference between FIGS. 1 and 5, following step 110, the methods can include the Broker 20 notifying, at step 200, the interceptor 26 (and in particular the control software 60) of a received request for Key DNA. Continuing with the above example, the interceptor 26 is informed of Request X (that otherwise includes the Request Pool Identifier signifying an intention to transfer information from the Sender DASB client 22 to the Receiver DASB client 24). In some embodiments, generic information is provided to the interceptor 26 at step 200. In other embodiments, contextual information is provided to the interceptor 26 at step 200 (i.e., providing the interceptor 26 with some level of information about the particular request for encryption such as, for example, the sender and receiver client devices, the time of request, etc.).

At step 202, the interceptor 26 is operated to facilitate approval or denial of Request X. For example, the interceptor 26 can present (e.g., display) information relating to Request X to an authorized human administrator who then either approves or denies the request. The decision to approve or deny Request X is communicated from the interceptor 26 to the Broker 20 at step 204. In some optional embodiments, if the Broker 20 does not receive a response from the interceptor 26 after a predetermined period of time (e.g., 1 minute), the Broker 20 informs the Sender DASB client 22 that the approval status for Request X is pending (which message, in turn, can be conveyed to the user of the Sender DASB client 22) as at step 206. Further status updates can be provided on a periodic basis. If, at step 204, the Broker 20 is informed that Request X has been approved ("YES"), the Broker 20 generates Key DNA X and Moniker X as described above (i.e., the method continues to step 114 of FIG. 2A). If, at step 204, the Broker 20 is informed that Request X has been declined ("NO"), the Broker 20 does not provide the Sender DASB client 22 with Key DNA, and Data X cannot be encrypted (step 208). With other optional embodiments, the system 10 can be configured or programmed such that under circumstances in which the interceptor 26 does not respond to a request for approval after a predetermined time period, the Broker 20 generates and delivers the Key DNA and moniker to a Sender DASB client, the Sender DASB client generates a Key based upon the received Key DNA and encrypts the data in question using the so-generated Key, and the Sender Application sends the encrypted data and the moniker to the interceptor 26 for a decision as to whether or not the encrypted data and moniker can be sent to the Receiver Application.

Figure 6:
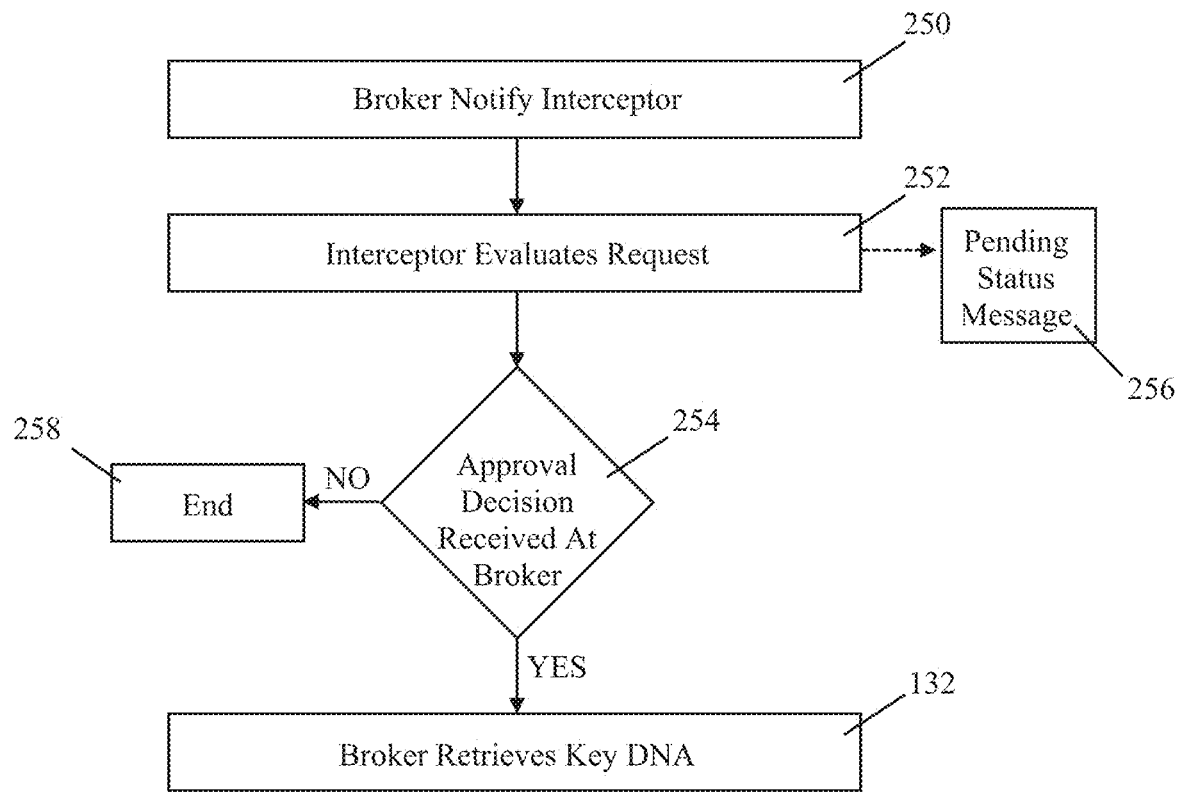
FIG. 6 is a flow diagram of steps performed in accordance with some methods of the present disclosure, including optional operation of an interceptor device to review a request to decrypt data.
Figure 7:
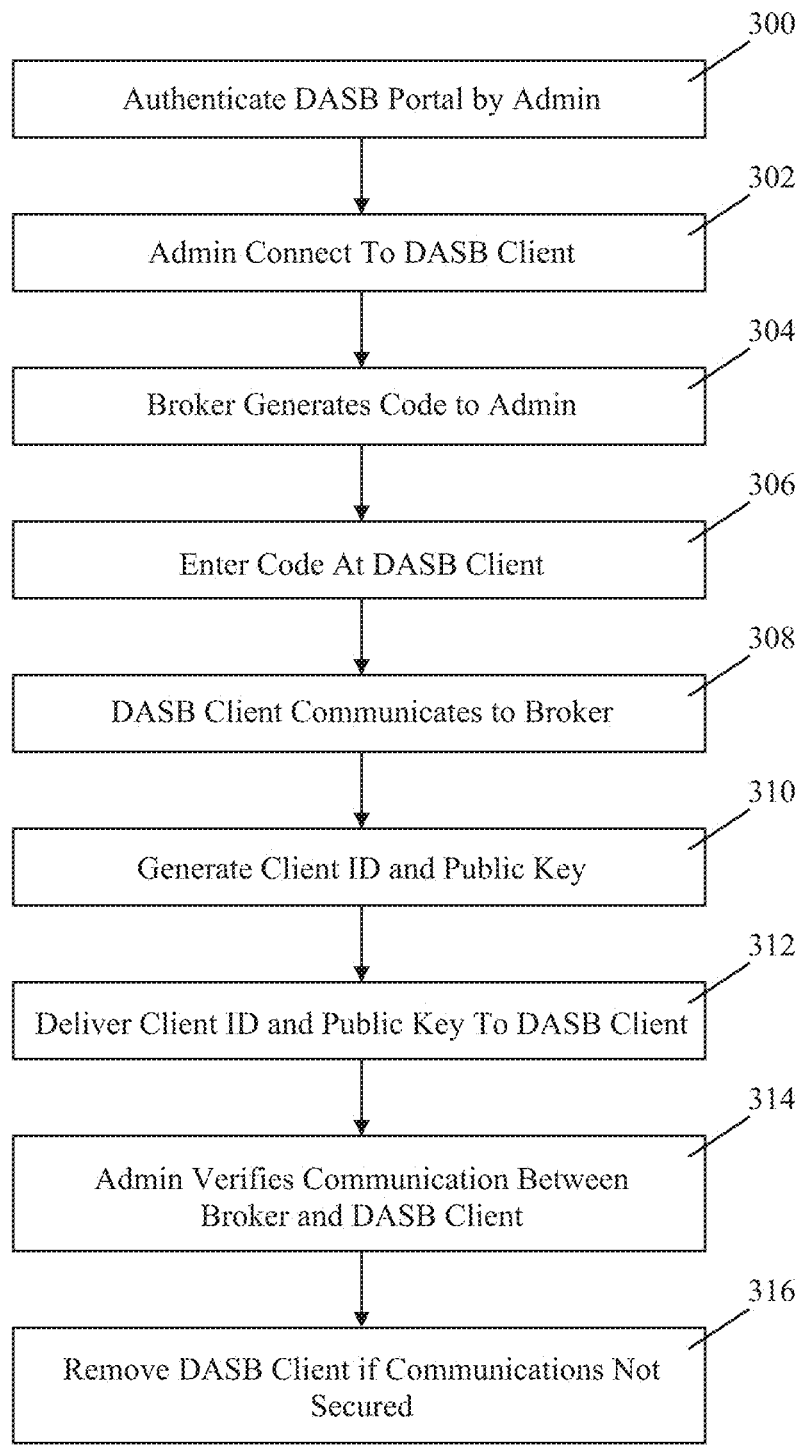
FIG. 7 is a flow diagram of steps performed in accordance with some methods of the present disclosure, including provisioning a client device within the system of FIG. 1.
Figure 8:
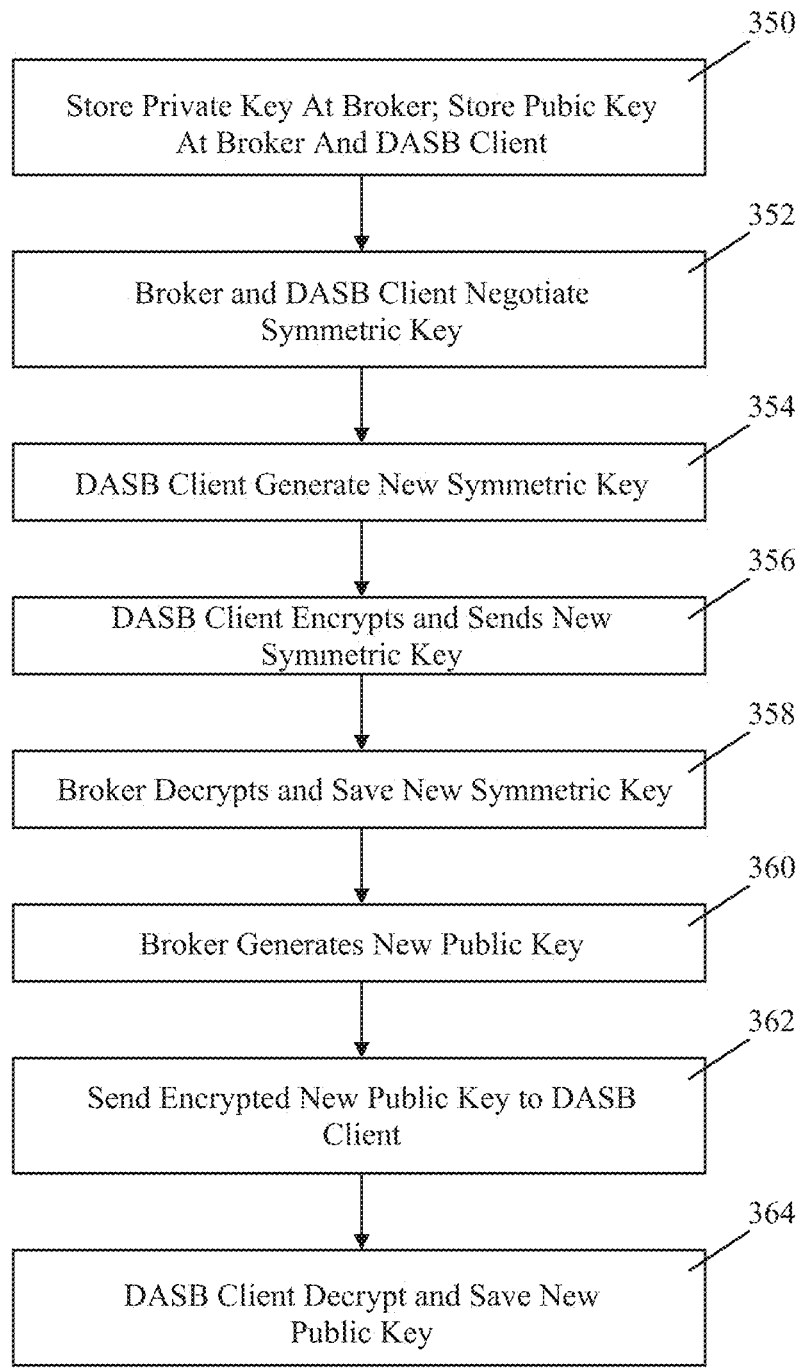
FIG. 8 is a flow diagram of steps performed in accordance with some methods of the present disclosure, including optional rotation of keys employed by a broker device and client device of the system of FIG. 1.
Figure 9:
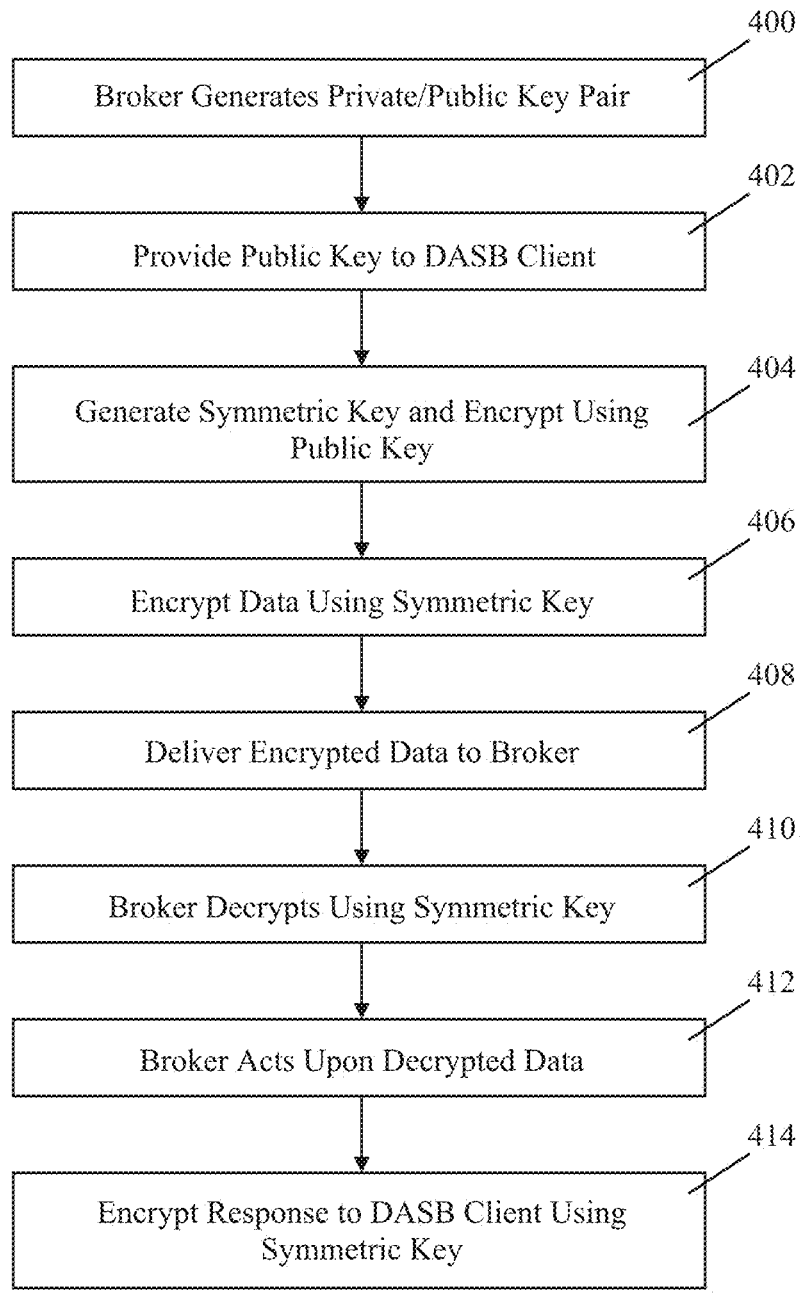
FIG. 9 is a flow diagram of steps performed in accordance with some methods of the present disclosure, including an optional method of performing session management.
Figure 10:
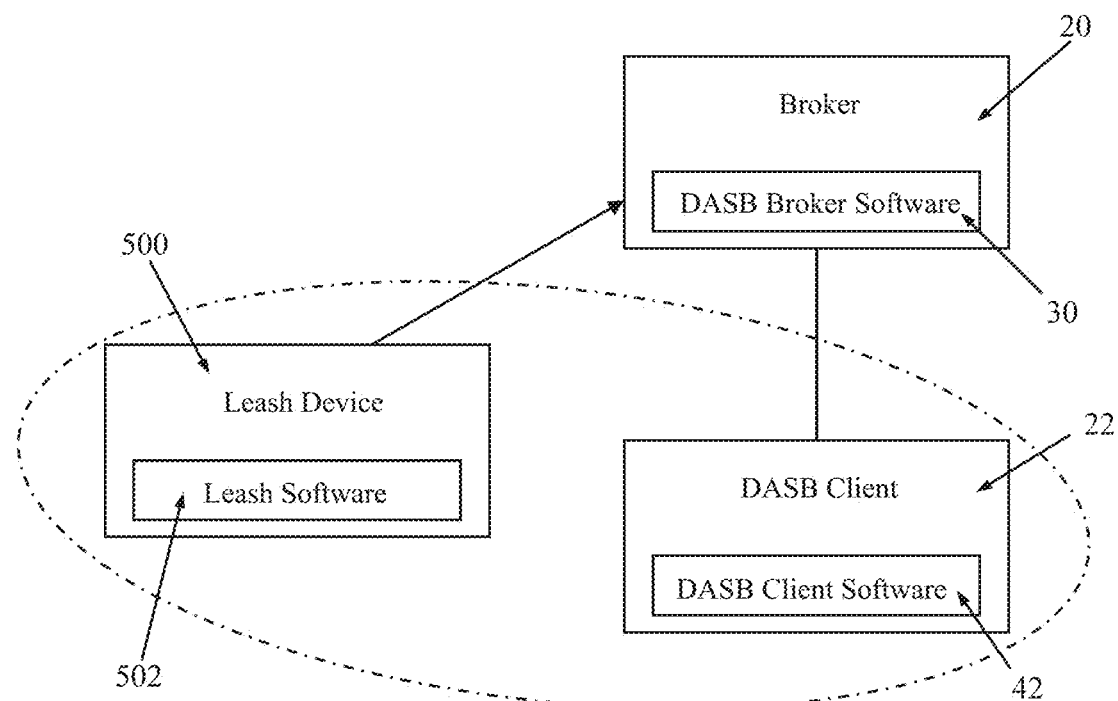
FIG. 10 is a block diagram illustrating another system in accordance with principles of the present disclosure, including an optional leash device.

In other embodiments, after a request for Key DNA X including a Moniker X is received at the Broker 20 (i.e., step 130) and before Key DNA X is generated and delivered in response to the request (i.e., step 132), methods of the present disclosure can include interfacing with the interceptor 26 as shown in FIG. 6. For example, and with reference between FIGS. 1 and 6, following step 130, the methods can include the Broker 20 notifying, at step 250, the interceptor 26 (and in particular the control software 60) of a received request for Key DNA X for purposes of decryption. In some embodiments, generic information is provided to the interceptor 26 at step 250. In other embodiments, contextual information is provided to the interceptor 26 at step 250 (i.e., providing the interceptor 26 with some level of information about the particular request for encryption such as, for example, the sender and recipient client devices, the time of the request, etc., otherwise available to the Broker 20 via knowledge of the assigned moniker that allows the Broker 20 to look up the pool, the client devices, interceptor rules, etc.; a customized message can also be provided to the interceptor 26).

At step 252, the interceptor 26 is operated to facilitate approval or denial of the request for Key DNA X. For example, the interceptor 26 can present (e.g., display) the request to an authorized human administrator who then either approves or denies the request. The decision to approve or deny the request for Key DNA X is communicated from the interceptor 26 to the Broker 20 at step 254. In some optional embodiments, if the Broker 20 does not receive a response from the interceptor 26 after a predetermined period of time (e.g., 1 minute), the Broker 20 informs the Receiver DASB client 24 that the approval status for the request is pending (which message, in turn, can be conveyed to the user of the Receiver DASB client 24) as at step 256. Further status updates can be provided on a periodic basis. If, at step 254, the Broker 20 is informed that the request for Key DNA X has been approved ("YES"), the Broker 20 retrieves Key DNA X as described above (i.e., the method continues to step 132 of FIG. 2B). If, at step 254, the Broker 20 is informed that the request for Key DNA X has been declined ("NO"), the Broker 20 does not provide the Receiver DASB client 24 with Key DNA X, and Encrypted Data X cannot be decrypted (step 258).

As mentioned above, with some methods of the present disclosure, each DASB client and corresponding DASB Client Software utilized with the system 10 is provisioned for authorized, secured interface with the Broker 20 (e.g., steps 100 and 102 of FIG. 2A). DASB Client provisioning can be accomplished in various manners, and in some embodiments facilitates confirmed, secured communication between the DASB Client Software installed to a particular client device and the Broker 20. One non-limiting example of a method for provisioning in accordance with principles of the present disclosure is provided in FIG. 7. As a point of reference, prior to the start of the DASB client provisioning operation, DASB Client Software has been installed to a client device, and an administrator account has been established in a DASB portal operating on the Broker 20.

At step 300, a human user authorized to use the administrator account ("Admin") authenticates against the DASB portal and initiates the DASB Client provisioning process. The Admin also connects to the DASB Client Software on the client device in question (either via a browser or through an application-specific view) at step 302. At step 304, the Broker 20 generates a code (e.g., a time restricted, one time code) that is provided to the Admin at the DASB portal. At step 306, the Admin repeats or enters the code at the client device in question (and thus to the corresponding DASB Client Software). The DASB Client Software of the client device in question uses the entered code to communicate with the Broker 20 at step 308. Upon receiving the entered code, the Broker 20 generates a DASB Client ID and a DASB Client Public Key at step 310 that are then communicated to the DASB Client Software of the client device in question at step 312. The Admin (or other human user) then verifies, at step 314, communication between the Broker 20 and the DASB client in question and designates the DASB Client Software in question as being provisioned. In some embodiments, the communications between the Broker 20 and a so-provisioned DASB client is considered trusted or secure. If, at step 316, the Admin determines that the Broker 20 and the client device in question are not communicating securely, the client device in question is removed from the Broker 20 and the provisioning process must be re-initiated. For example, if an imposter DASB client device begins communicating with the Broker 20 during the provisioning process (i.e., the imposter DASB client device intercepted the authentication information), this communication would prevent the Admin's client device from communicating with the Broker 20. The Admin would notice that his/her device was not communicating and therefore would know that an imposter device had connected.

With some methods of the present disclosure, secured communication between the Broker 20 and any DASB client within the system 10 (or trust environment) is provided by using key encryption techniques understood by those of ordinary skill (e.g., symmetric key encryption). With this in mind, some optional methods of the present disclosure promote and confirm secure communications between the Broker 20 and each of the client devices of the system 10 by rotating keys used for Broker-DASB client communications. For example, and with reference to FIG. 8, some optional methods of the present disclosure can include, with provisioning of a particular client device, the DASB client establishing and storing a unique DASB Client Private Key, and establishing a DASB Client Public Key that is stored on the DASB client in question (and optionally at the Broker) at step 350. At step 352, the Broker and the DASB client in question negotiate a symmetric key for communication based upon the DASB Client Public Key; this negotiated symmetric key serves as the initial "current" symmetric key for secure communications. At step 354, a new symmetric key for confirmed, secure communication between the Broker and the DASB client in question is periodically (e.g., random intervals) generated by the DASB client in question, or is negotiated between the Broker and the DASB client in question. The new symmetric key is encrypted using the current symmetric key and the assigned DASB Client Public Key, and is transferred to the Broker or the DASB client in question at step 356. At step 358, encrypted new symmetric key is decrypted (e.g., by the assigned DASB Private Key) and saved (replacing the stored current symmetric key with the new symmetric key; in other words, the new symmetric key becomes the current symmetric key) for subsequent communications between the Broker and the DASB client in question.

At step 360, a new DASB Client Public Key for the DASB client in question is periodically generated (e.g., at random intervals) by the Broker. The Broker encrypts the new DASB Client Public Key using the current symmetric key and transfers to the DASB client in question at step 362. At step 364, the DASB client in question is operated to decrypt the encrypted new DASB Client Public Key, and save the new DASB Client Public Key for subsequent communications with the Broker.

As implicated by the above, the systems and methods of the present disclosure provide session management features with communications between a DASB client and the Broker 20. For example, the DASB clients can communicate with the Broker 20 by managing their own sessions for securing the data payload (i.e., communications (commands, associated data payloads, etc., between a DASB client and the Broker 20 are subject to security protocols). The Key-DNA methods of the present disclosure facilitate secure communications between DASB clients, whereas session management provides secure communications between the Broker and a DASB client. With reference between FIGS. 1 and 9, one non-limiting example of a session management methodology of the present disclosure between the Broker 20 and the DASB client 22 can include, at step 400, the Broker 20 utilizing an asymmetric cryptography algorithm (e.g., RSA) to generate private/public key pairs. In response to a request from the DASB client 22, the Broker 20 delivers the so-generated public key to the DASB client at step 402. The DASB client 22 generates a symmetric key and encrypts the so-generated symmetric key using the public key at step 404. At step 406, the DASB client 22 utilizes the symmetric key to encrypt data to be sent to the Broker 20 (commands, payload, etc.). The encrypted data is delivered to the Broker 20 at step 408. The Broker decrypts the received encrypted data using the symmetric key at step 410. At step 412, the Broker 20 acts upon the received (and now decrypted) data as necessary; any responsive communication, data, command, etc., is encrypted using the same symmetric key and returned to the DASB client 22 at step 414. It will be understood that each DASB client in a particular trust environment can use this same session management approach to securely interact with the Broker 20, but will have its own unique set of public/private keys/symmetric keys (e.g., the symmetric key used for secure communications between the first DASB client 22 and the Broker 20 will differ from the symmetric key used for secure communications between the second DASB client 24 and the Broker 20). In some related, non-limiting examples, each DASB client can use a different asymmetric cryptographic algorithm.

In some embodiments, the session management features or modes of the present disclosure can optionally further include rotating the symmetric key on a random interval (e.g., between 1-15 minutes), and can be controlled by the DASB client in question. The private/public key pair can also be rotated, but on a coarser interval in some embodiments. In this regard, the session management features or modes can include selecting a different asymmetric cryptography algorithm when rotating the private/public key pair, for example based on preferences of the owner or operator of the system 10. By way of non-limiting example, an owner or operator of the system 10 can configure the system 10 such that in a session management mode of operation, the system 10 randomly selects between a set of available cryptographic algorithms. The Broker uses either a specific configuration (programming) or predefined defaults in the absence of a specific configuration to select the appropriate cryptographic algorithms for generating public/private key pairs, as well as monitoring the time when the changes need to occur. The Broker also supplies to the DASB client the session-related symmetric key rotation time interval. The DASB client is programmed to pick a random time interval between 1 and a specified value for every symmetric key rotation period. As newer algorithms are deployed, the owner of each DASB client has the ability to upgrade their corresponding DASB Client Software to utilize these new algorithms. In one example, the new algorithms can be made available to client device users as a patch to their existing (and provisioned) DASB client without having to upgrade the entire client device.

In some non-limiting embodiments, the systems and methods of the present disclosure allow for implementation of customized cryptographic algorithms between DASB clients (also referred to as "payload management"). For example, the DASB Client Software provided with selected DASB client devices of the system 10 can permit an owner or operator of the system 10 to enter a customized cryptographic algorithm from which the DASB clients generates a Key (utilizing the Key DNA provided from the Broker 20 as described above). By way of example, two DASB clients (e.g., DASB client A and DASB client B) in a trust relationship must have the same set of customized cryptographic algorithms. The owner or operator of the trust environment installs these customized cryptographic algorithms to each of DASB client A and DASB client B, along with an indicator(s) (e.g., a textual string, a number sequence, etc.). The owner/operator further specifies at the Broker which DASB clients have the customized algorithms and provides the corresponding indicator(s) representing the so-designated customized cryptographic algorithms. Thus, only the indicator(s) persists at the Broker. Under circumstances where DASB client A is a sender and DASB client B is a receiver, upon receiving a request for new Key DNA from DASB client A, the Broker generates Key DNA as described above and may randomly select the customized cryptographic algorithm. The Broker then sends the Key DNA and the indicator corresponding with the selected customized cryptographic algorithm to DASB client A. DASB client A, in turn, upon seeing the indicator, will then use the corresponding cryptographic algorithm to encrypt the data/payload in question and send to DASB client B. It can be possible, therefore, to view the indicator as being "part" of the Key DNA that enables generation of the Key. Upon receiving the encrypted data/payload, DASB client B sends a request to the Broker for Key DNA as described above. The Broker, in turn, sends to DASB client B the Key DNA and the same indicator as provided to DASB client A. Because DASB client B has the same indicator, the same customized cryptographic algorithm will be selected to decrypt. If the algorithm corresponding to the indicator has not been installed on DASB client B, the operation results in an error. Alternatively or in addition, two or more DASB clients in the system 10 can be configured or provisioned as having a known, trusted relationship (i.e., two or more DASB clients are known to be involved in a trust relationship), and come pre-installed with a few (or more) selected symmetric cryptographic algorithms (e.g., AES, Salsa20, etc.). Payload management can optionally include the Broker selecting (e.g., randomly selecting) which cryptographic algorithm to use for a particular encrypted data transfer based on customer configuration. These are related embodiments, where the operator or owner of the system 10 can field upgrade the DASB Client(s) (otherwise in a trusted relationship) to use one or more custom cryptographic algorithms that are otherwise unknown to the Broker or use pre-installed cryptographic algorithms. These custom cryptographic algorithm(s) can be used in lieu of or alongside the system-provided algorithms as configured by the operator or owner of the system 10.

The systems and methods of the present disclosure can optionally include one or more additional features or operations. For example, in some embodiments, the systems and methods of the present disclosure incorporate a logging feature in which designated transactions (including all transactions) between a provisioned DASB client and the Broker 20 are tracked or logged and saved (e.g., at the Broker 20). In some embodiments, every request for Key DNA in conjunction with a request to encrypt is tracked, and in related embodiments every request for Key DNA in conjunction with a request to decrypt is saved. The logged or tracked information can include, for example, when (e.g., day, time, etc.) a request to encrypt or decrypt was received, the Client ID associated with a particular request, etc. The logged information can be secured using cryptographic signatures such that it cannot be mutated post-creation. In some implementations, the method of securing logs can be accomplished via distributed ledger or blockchain.

In some embodiments, the optional logging operations can further provide auditable security, affording the ability to know with a high level of confidence as to whether or not a particular data transfer was secure. Because the transfer logs are immutable, and because the encryption associated with each data transfer is unique, it is possible to "know" with certainty who or what device had access to a particular Key DNA. Using existing logs, a user can verify the security of a particular data transfer in various manners in accordance with principles of the present disclosure. For example, a user can request all activity for a specified message or stream (as identified, for example, by the corresponding Moniker). The activity report or log can then be reviewed to ensure that all encryptions were done by the Sender DASB client in question. The listing of encryptions can be correlated against the Sender DASB client's log of encryptions as saved at the Broker 20. Similarly, the activity report or log can be reviewed to ensure that all decryptions were done by the intended Receiver DASB client(s) in question. The listing of decryptions can be correlated against the Receiver DASB client's log of decryptions as saved at the Broker 20. Alternatively or in addition, any unauthorized attempts to access the Key associated with a designated data transfer can be logged. This will not indicate a breach, but will indicate an attempted breach as well as indicate that an attacker gained access to the cryptotext/encrypted data. As a point of reference, an "unauthorized attempt" can take various forms, such as an attempted access by an unknown party (not part of the system 10); an attempted access by a known party (of the system 10), but for whom the encrypted data or message was not encoded; an attempted access by the intended receiver client device, but they attempt to access it more times than is allowed (e.g., the system 10 can be configured to permit only a single attempt to decrypt, but even with N decrypt attempts allowed, the intended Receiver DASB client may attempt to decode in N+1 times and this would generate an error); etc.

While the methods described above include the Broker 20 generating the Key DNA for delivery to a DASB client in response to a request to encrypt, and storing the Key DNA for subsequent delivery to a DASB client in response to a request to decrypt, other techniques can be employed. For example, in some alternative embodiments, the DASB Client Software can be programmed to generate some or all of the Key DNA to be utilized for a particular encryption transaction and sending the Key DNA (via the Sender Application) to the Broker 20. In other embodiments, the DASB Client Software can be programmed to generate some of the Key DNA and to send (via the Sender Application) the partial Key DNA information to the Receiver DASB client (via the Receiver Application), thus bypassing the Broker 20. With these and related embodiments, the Broker 20 can be programmed to generate a remainder of the Key DNA which is delivered to the DASB client requesting a decryption operation; the Receiver DASB client will be programmed to generate the complete Key DNA from the partial Key DNA provided by the Sender Application and the Broker 20.

Similarly, while the methods described above include the Broker 20 generating the moniker in response to a request to encrypt, other techniques can be employed. For example, in some alternative embodiments, the DASB Client Software is programmed to generate a moniker to be included (via the Sender Application) with a request to the Broker 20. The Broker 20 can store the moniker for delivery to a requesting DASB client, or the moniker can be delivered to a Receiver Application via the Sender Application.

In some non-limiting embodiments, the systems and methods of the present disclosure can optionally operate to minimize the risk of unauthorized copying of DASB Client Software from a DASB client device (and using the copied DASB Client Software to impersonate a provisioned or authorized DASB client). For example, the systems and methods of the present disclosure can effect or implement a standalone "leash" or "leash holder" device (or intermediary device) that acts as a control intermediary between the Broker and a DASB client. One representation of this relationship is provided in FIG. 10 in which the DASB Client 22 is provisioned with the Broker 20, and is electronically linked to a Leash Device 500 (e.g., a computer or computer-like device otherwise programmed or operating corresponding Leash Software 502). Constant communication between the Leash Device 500, the DASB client 22, and the Broker 20 helps prevent the DASB Client 22 from being impersonated. One feature that can facilitate this arrangement is that the Leash Device 500 is configured on the same subnet (represented by a dashed line in FIG. 10) as the DASB client 22, and is not reachable from outside this subnet. However, the Leash Device 500 is able to make outbound "calls" to the Broker 20.

In one example arrangement, an owner or operator of the system configures (e.g., programs or instructs) the Broker 20 as to the desired frequency of communication between the DASB Client 22 and the Leash Device 500, and configures token validity rules. The DASB client 22 contacts the Leash Device 500, for example always on startup and subsequently at the defined interval, and receives a token from the Leash Device 500. The Leash Device 500, as part of this interaction, then communicates with the Broker 20 and provides a cryptographic hash of the token. When the DASB client 22 communicates with the Broker 20, the DASB client 22 provides the Broker 20 with the token. The Broker 20 computes the cryptographic hash from the received token and compares this computed has against the cryptographic hash previously received from the Leash Device 500. If the values match, the communication as received by the Broker 20 is considered as having been delivered from the DASB client 22 that is otherwise safely tethered or leashed. The Broker 20 can also keep track of the frequency of the communication from the DASB client 22. If the DASB client 22 fails to communicate within a specified period of time, the DASB client 22 can be marked by the Broker 20 as non-functional. Under these circumstances, a manual reset of the process can be instituted, forcing the customer/system operator to validate the whereabouts of the DASB client 22.

In the above explanations, reference is made to cryptographic algorithms. In some embodiments, all cryptographic algorithms (e.g., for session management, Key DNA generation, etc.) require the use of Cryptographically Secure Pseudo Random Number Generators (CSPRNG). In some embodiments, the systems and methods of the present disclosure utilize operating system (OS) provided tools to generate these numbers. However, a user or system owner can provide callable processes that generate random numbers using their own custom cryptographically secure random number generator. This generator can be made accessible to the trust environment in question by using calling protocols such as REST, gRPC, etc. Various deployment approaches can be used to secure access between the Broker 20. The user or system owner can configure which DASB client devices/pools use which generator, facilitating the use of different random number generators for different purposes. An outcome of this optional approach can allow the system 10 to use itself to protect the delivery of random numbers to the Broker 20. For example, a particular DASB client can be configured to use the system-provided random number generator and is used by the generator to safely create and deliver random numbers; the Broker 20 has a matching device to decrypt the numbers. The Broker 20 can then use these random numbers for DASB clients that are configured to use them.

Figure 11:
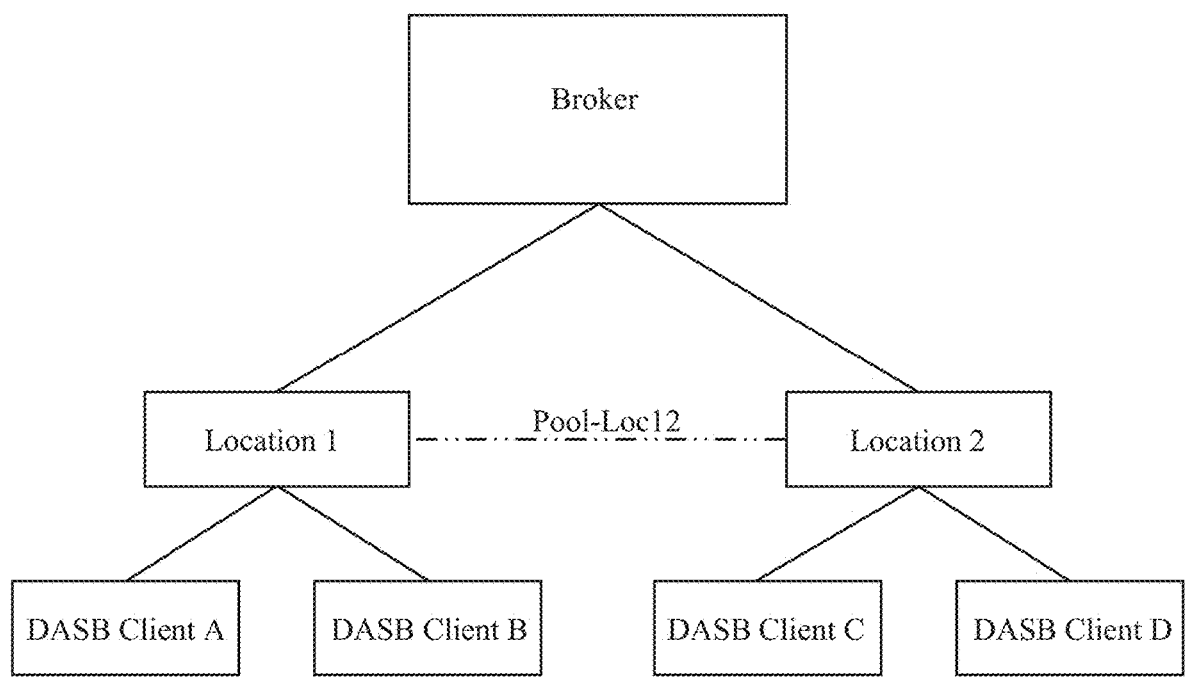
FIG. 11 is a block diagram illustrating another system in accordance with principles of the present disclosure, including an optional logical node arrangement.

In order to facilitate high availability or greater scale at a location (also referred to as load balancing), having backup or multiple active hardware devices is a commonly-used technique. In order to enable high availability/load balancing, some non-limiting embodiments of the present disclosure can create an abstraction of the endpoint of a trusted communication (i.e., one end of a pool) as a logical unit, called a "node" that is comprised of multiple DASB clients. With reference to FIG. 11, for example, DASB client A, DASB client B, DASB client C, and DASB client D are all provisional DASB client devices of a trust environment managed by the Broker 20. Further, DASB client A and DASB client B are independently provisioned as member DASB clients of node "Location 1", whereas DASB client C and DASB client D are independently provisioned as member DASB clients of node "Location 2". The node Locations 1 and 2 exist virtually at the Broker 20; while provisioned and managed independently, a pool (Pool-Loc12) is established at the Broker 20 between the two nodes Location 1, Location 2. With this arrangement, any of the DASB clients that comprise node Location 1 (i.e., DASB client A and DASB client B) can act as the DASB client for node Location 1. Similarly, any of the DASB clients that comprise node Location 2 (i.e., DASB client C and DASB client D) can act as the DASB client for node Location 2. The owner or operator of the system can define these logical units in the Broker 20 and assigns the requisite DASB clients to these logical units. The trust relationship is established by defining a pool that connects these two logical unit.

Although the present disclosure has been described with reference to preferred embodiments, workers skilled in the art will recognize that changes can be made in form and detail without departing from the spirit and scope of the present disclosure.

What is claimed is:

1. A secure electronic data transfer system for use with a first client computing device, a second client computing device, and a broker computing device each connected to a network and each including a respective processor, the system comprising:
   a first client non-transitory computer readable medium storing instructions executed by the processor of the first client computing device;
   a second client non-transitory computer readable medium instructions executed by the processor of the second client device;
   a broker non-transitory computer readable medium storing instructions executed by the processor of the broker computing device;
   wherein the instructions of the first client non-transitory computer readable medium, the instructions of the second client non-transitory computer readable medium, and the instructions of the broker non-transitory computer readable medium cause the broker computing device, the first client computing device, and the second client computing device, respectively, to:
   receive at the first client computing device a Key DNA and a Moniker;
   store the Key DNA and the Moniker at the broker computing device;
   generate at the first client computing device a Key based upon the Key DNA;
   encrypt data stored on the first client computing device using the Key to generate Encrypted Data;
   electronically transfer the Encrypted Data and the Moniker from the first client computing device to the second client computing device;
   deliver, by the second client computing device, the Moniker to the broker computing device;
   receive, by the first client computing device, the Key DNA from the broker computing device;
   generate at the second client computing device the Key based upon the Key DNA; and decrypt the Encrypted Data using the Key by the second client computing device.

2. The system of claim 1, wherein the instructions of the first client non-transitory computer readable medium further cause the first client computing device to:
remove the Key from the first client computing device after encrypting the data.

3. The system of claim 2, wherein the instructions of the second client non-transitory computer readable medium further cause the second client computing device to:
remove the Key from the second client computing device after decrypting the Encrypted Data.

4. The system of claim 1, wherein the instructions of the first client non-transitory computer readable medium and the instructions of the broker non-transitory computer readable medium further cause the first client computing device and the broker computing device, respectively, to:
deliver a request for a Key DNA from the first client computing device to the broker computing device; and
operate the broker computing device to approve or decline the request for the Key DNA.

5. The system of claim 4, further comprising an interceptor non-transitory computer readable medium storing instructions executed by a processor of an interceptor computing device, wherein the instructions of the broker computer readable medium and the instructions of the interceptor computer readable medium further cause the broker computing device and the interceptor computing device, respectively, to:
deliver, from the broker computing device to the interceptor computer device, a request for verification of an intended transfer of data from the first client computing device to the second client computing device; and
operate the interceptor computing device to approve or decline the request for verification.

6. The system of claim 1, further comprising a third client non-transitory computer readable medium storing instructions executed by a processor of a third client computing device, wherein the instructions of the first client computer readable medium, the instructions of the broker computer readable medium, and the instructions of the third client computer readable medium further cause the first client computing device, the broker computing device, and the third client computing device, respectively, to:
electronically transfer the Encrypted Data and the Moniker from the first client computing device to the third client computing device;
deliver, by the third client computing device, the Moniker to the broker computing device;
receive, by the third client computing device, the Key DNA from the broker computing device;
generate at the third client computing device the Key based upon the Key DNA; and
decrypt the Encrypted Data using the Key by the third client computing device.

7. The system of claim 6, wherein the instructions of the broker non-transitory computer readable medium further cause the broker computing device to:
delete the Key DNA and the Moniker from the broker computing device based upon predetermined rules.

8. The system of claim 1, wherein the instructions of the broker non-transitory computer readable medium further cause the broker computing device to:
log information at the broker computing device indicative of the broker computing device having received a request for the Key DNA from the first client computing device or the second client computing device.

9. The system of claim 1, wherein the instructions of the broker non-transitory computer readable medium further cause the broker computing device to create the Key DNA and the Moniker.

10. The system of claim 1, wherein the instructions of the first client non-transitory computer readable medium further cause the first client computing device to create the Moniker.

11. The system of claim 1, wherein the instructions of the second client non-transitory computer readable medium further cause the second client computing device to create at least a portion of the Key DNA.

12. The system of claim 1, wherein the instructions of the first client non-transitory computer readable medium further cause the first client computing device to:
create a portion of the Key DNA at the first client computing device, and
electronically transfer the portion of the Key DNA from the first client computing device to the second client computing device.

13. The system of claim 1, wherein the electronic data transfer is part of a streaming communication from the first client computing device to the second client computing device, the Key DNA is a first Key DNA, the Key is a first Key, the data is a first packet of data of the streaming communication, and the Encrypted Data is a first packet of Encrypted Data of the streaming communication, and further wherein the instructions of the first client non-transitory computer readable medium, the instructions of the second client non-transitory computer readable medium, and the instructions of the broker non-transitory computer readable medium further cause the first client computing device, the second client computing device, and the broker computing device, respectively, to, following the step of electronically transferring the first packet of Encrypted Data and the Moniker from the first client computing device to the second client computing device:
receive at the first client computing device a second Key DNA, the second Key DNA differing from the first Key DNA;
generate at the first client computing device a second Key based upon the second Key DNA;
encrypt, by the first client computing device, a second packet of data of the streaming communication using the second Key to generate a second packet of Encrypted Data;
electronically transfer the second packet of Encrypted Data from the first client computing device to the second client computing device;
receive, by the second client computing device, the second Key DNA from the broker computing device;
generate at the second client computing device the second Key based upon the second Key DNA; and
decrypt the second packet of Encrypted Data using the second Key by the second client computing device.

14. The system of claim 13, wherein the instructions of the first client non-transitory computer readable medium further cause the first client computing device to store a key rotation rule based upon which a timing of a change from the first Key DNA to the second Key DNA during the course of the streaming communication is determined.

15. The system of claim 1, wherein communications between the broker computing device and each of the first and second client computing devices are secure.

16. The system of claim 1, wherein the instructions of the first and second client non-transitory computer readable mediums are identical.

* * * * *